United States Patent
Zhang

(10) Patent No.: US 10,841,208 B2
(45) Date of Patent: Nov. 17, 2020

(54) SLICE/SERVICE-BASED ROUTING IN VIRTUAL NETWORKS

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/440,749

(22) Filed: Feb. 23, 2017

(65) Prior Publication Data

US 2018/0041424 A1 Feb. 8, 2018

Related U.S. Application Data

(60) Provisional application No. 62/399,206, filed on Sep. 23, 2016, provisional application No. 62/376,820,
(Continued)

(51) Int. Cl.
*H04L 12/725* (2013.01)
*H04L 12/741* (2013.01)
(Continued)

(52) U.S. Cl.
CPC .......... *H04L 45/30* (2013.01); *H04L 12/4633* (2013.01); *H04L 12/4641* (2013.01);
(Continued)

(58) Field of Classification Search
CPC . H04L 12/46; H04L 12/4641; H04L 12/4645; H04L 45/50; H04L 45/586;
(Continued)

(56) References Cited

U.S. PATENT DOCUMENTS 7,227,863 B1 6/2007 Leung et al.
7,856,014 B2 12/2010 Kreuk
(Continued)

FOREIGN PATENT DOCUMENTS

CN 101352003 A 1/2009
CN 101668022 A 3/2010
(Continued)

OTHER PUBLICATIONS

International Search Report dated Oct. 27, 2017 for corresponding International Application No. PCT/CN2017/096172 filed Aug. 7, 2017.
(Continued)

*Primary Examiner* — Harun Chowdhury

(57) ABSTRACT

Routing packets through a virtual network (VN) in support of service-based traffic forwarding is provided. Data packets are routed using a virtual router (v-router) toward a destination end point over a pre-configured VN. The v-router is associated with a VN node, which is associated with a physical network node (NN). A data packet associated with the VN is received and a name identifier of the destination end point is specified. A location corresponding to the name identifier is obtained. An indication of a destination VN node corresponding to the location is obtained. An indication of a next VN node on a path between the virtual router and the destination VN node is obtained. The indication of the next VN node is inserted into the packet to produce a routed packet. The routed packet is submitted to the associated NN for transmission toward the next node.

24 Claims, 23 Drawing Sheets

| End Point Routing Table | | 432 |
|---|---|---|
| VN ID = 1 (service ID) | Destination routing | Tunnel-by-tunnel routing |
| End-point name ID = B | Destination VN Node ID = 2 (Or NN 4) | Next VN Node ID = 2 (or IP address of next VN Node) |

Related U.S. Application Data filed on Aug. 18, 2016, provisional application No. 62/371,628, filed on Aug. 5, 2016.

(51) Int. Cl.

| | | |
|---|---|---|
| *H04W 40/00* | (2009.01) | |
| *H04W 4/70* | (2018.01) | |
| *H04L 12/751* | (2013.01) | |
| *H04L 12/713* | (2013.01) | |
| *H04W 40/20* | (2009.01) | |
| *H04L 12/46* | (2006.01) | |
| *H04L 12/24* | (2006.01) | |
| *H04L 29/08* | (2006.01) | |
| *H04W 76/11* | (2018.01) | |
| *H04W 12/06* | (2009.01) | |
| *H04W 24/08* | (2009.01) | |
| *H04W 60/00* | (2009.01) | |
| *H04W 64/00* | (2009.01) | |
| *H04W 72/04* | (2009.01) | |
| *H04L 12/715* | (2013.01) | |
| *H04W 4/06* | (2009.01) | |

(52) U.S. Cl.
CPC ...... *H04L 12/4645* (2013.01); *H04L 41/0803* (2013.01); *H04L 45/02* (2013.01); *H04L 45/586* (2013.01); *H04L 45/74* (2013.01); *H04L 45/745* (2013.01); *H04L 67/34* (2013.01); *H04W 4/70* (2018.02); *H04W 12/06* (2013.01); *H04W 24/08* (2013.01); *H04W 40/00* (2013.01); *H04W 40/20* (2013.01); *H04W 60/00* (2013.01); *H04W 64/00* (2013.01); *H04W 72/042* (2013.01); *H04W 76/11* (2018.02); *H04L 41/12* (2013.01); *H04L 45/302* (2013.01); *H04L 45/64* (2013.01); *H04W 4/06* (2013.01)

(58) Field of Classification Search
CPC ... H04L 45/68; H04L 45/745; H04L 12/4633; H04L 45/30; H04W 4/70
USPC ............................ 370/355, 390, 392; 718/1
See application file for complete search history.

(56) References Cited

U.S. PATENT DOCUMENTS

| | | | |
|---|---|---|---|
| 8,478,902 B1 | 7/2013 | Holland et al. | |
| 8,660,129 B1 | 2/2014 | Brendel et al. | |
| 9,077,640 B2 | 7/2015 | So et al. | |
| 2003/0041170 A1 | 2/2003 | Suzuki | |
| 2004/0013120 A1 | 1/2004 | Shen | |
| 2007/0117548 A1 | 5/2007 | Fernandez-Alonso et al. | |
| 2007/0153808 A1 | 7/2007 | Parker et al. | |
| 2008/0098472 A1 | 4/2008 | Enomoto et al. | |
| 2008/0192701 A1 | 8/2008 | Jeong et al. | |
| 2010/0074274 A1 | 3/2010 | Huguies | |
| 2010/0189115 A1 | 7/2010 | Kitada | |
| 2011/0111758 A1 | 5/2011 | Liu et al. | |
| 2011/0134931 A1 | 6/2011 | Merwe et al. | |
| 2012/0207026 A1 | 8/2012 | Sato | |
| 2012/0275787 A1 | 11/2012 | Xiong et al. | |
| 2013/0136123 A1* | 5/2013 | Ge .................. H04L 12/4641 370/390 |
| 2013/0336305 A1 | 12/2013 | Yan et al. | |
| 2013/0346585 A1 | 12/2013 | Ueno | |
| 2014/0056298 A1* | 2/2014 | Vobbilisetty ............ H04L 12/46 370/355 |
| 2014/0269513 A1 | 9/2014 | Yu et al. | |
| 2014/0307556 A1 | 10/2014 | Zhang | |
| 2014/0334485 A1 | 11/2014 | Jain et al. | |
| 2014/0362700 A1 | 12/2014 | Zhang et al. | |
| 2015/0071170 A1 | 3/2015 | Zhang et al. | |
| 2015/0072705 A1 | 3/2015 | Zhang et al. | |
| 2015/0143369 A1* | 5/2015 | Zheng ................. H04L 12/4645 718/1 |
| 2015/0200849 A1 | 7/2015 | Wen et al. | |
| 2015/0257012 A1 | 9/2015 | Zhang et al. | |
| 2015/0271067 A1* | 9/2015 | Li .......................... H04L 45/50 370/392 |
| 2015/0381493 A1 | 12/2015 | Bansal et al. | |
| 2016/0028626 A1 | 1/2016 | Koganti | |
| 2016/0105471 A1 | 4/2016 | Nunes et al. | |
| 2016/0119417 A1 | 4/2016 | Fang et al. | |
| 2016/0134527 A1 | 5/2016 | Kwak et al. | |
| 2016/0150421 A1 | 5/2016 | Li et al. | |
| 2016/0156513 A1 | 6/2016 | Zhang et al. | |
| 2016/0157043 A1 | 6/2016 | Li et al. | |
| 2016/0226755 A1 | 8/2016 | Hammam et al. | |
| 2016/0285736 A1 | 9/2016 | Gu | |
| 2017/0034053 A1* | 2/2017 | Chanda ................. H04L 45/586 |
| 2017/0181210 A1 | 6/2017 | Nadella et al. | |
| 2017/0201922 A1 | 7/2017 | Akiyoshi | |
| 2017/0250838 A1 | 8/2017 | Khawer et al. | |
| 2017/0374696 A1 | 12/2017 | Doll et al. | |
| 2018/0199276 A1 | 7/2018 | Zhang | |
| 2018/0248713 A1 | 8/2018 | Zanier et al. | |

FOREIGN PATENT DOCUMENTS

| | | |
|---|---|---|
| CN | 101808030 A | 8/2010 |
| CN | 102315925 A | 1/2012 |
| CN | 102469004 A | 5/2012 |
| CN | 102546735 A | 7/2012 |
| CN | 102549990 A | 7/2012 |
| CN | 102611629 A | 7/2012 |
| CN | 103001883 A | 3/2013 |
| CN | 103444143 A | 12/2013 |
| CN | 103491006 A | 1/2014 |
| CN | 103534997 A | 1/2014 |
| CN | 103607349 A | 2/2014 |
| CN | 103685026 A | 3/2014 |
| CN | 104104534 A | 10/2014 |
| CN | 104285416 A | 1/2015 |
| CN | 105227454 A | 1/2016 |
| CN | 105531961 A | 4/2016 |
| JP | 2003069609 A | 3/2003 |
| JP | 5125793 B2 | 1/2013 |
| WO | 2009054032 A | 4/2009 |
| WO | 2013142519 A1 | 9/2013 |
| WO | 2015180617 A1 | 12/2015 |
| WO | 2016014362 A1 | 1/2016 |

OTHER PUBLICATIONS

International Search Report dated Oct. 26, 2017 for corresponding International Application No. PCT/CN2017/096171 filed Aug. 7, 2017.

International Search Report dated Sep. 28, 2017 for corresponding International Application No. PCT/CN2017/096056 filed Aug. 4, 2017.

International Search Report dated Oct. 23, 2017 for corresponding International Application No. PCT/CN2017/096055 filed Aug. 4, 2017.

International Search Report dated Oct. 26, 2017 for corresponding International Application No. PCT/CN2017/096173 filed Aug. 7, 2017.

Zhang et al., "5G Wireless Network: MyNET and SONAC", IEEE Network vol. 29, Issue: 4, Jul.-Aug. 2015, pp. 14 to 23.

ETSI GS NFV-SWA 001 V0.2.4(Nov. 2014),Network Functions Virtualisation (NFV);Virtual Network Functions Architecture,total 93 pages.

Hang Zhang et al.,"5G wireless network: MyNET and SONAC",IEEE Network ( vol. 29 , Issue: 4, Jul.-Aug. 2015 ),total 10 pages.

(56) References Cited

OTHER PUBLICATIONS

E. Rosen et al.,"BGP/MPLS IP Virtual Private Networks (VPNs)", Request for Comments: 4364, Network Working Group, Feb. 2006, total 47 pages.

* cited by examiner

| VN Topology Description Table | |
|---|---|
| VN ID = 1 | |
| Domain ID = 1 | VN Node ID = 1 |
| Domain ID = 2 | VN Node ID = 2 |

FIG. 3B

| End-point Location Information obtained | | |
|---|---|---|
| VN ID = 1 | | |
| End-point ID = B | Domain ID = 2 | Cluster ID = Non |
| …… | | |

FIG. 3C

| Tunnel Configuration Table | |
|---|---|
| VN ID = 1 | |
| Destination VN Node = 1 | Next Hop VN Node ID (or tunnel ID) (NN address to which the VN Node = 1 associates) |
| Destination VN Node = 2 | Next Hop VN Node ID (or tunnel ID) (NN address = 4) to which the VN Node = 2 associates |

FIG. 3D

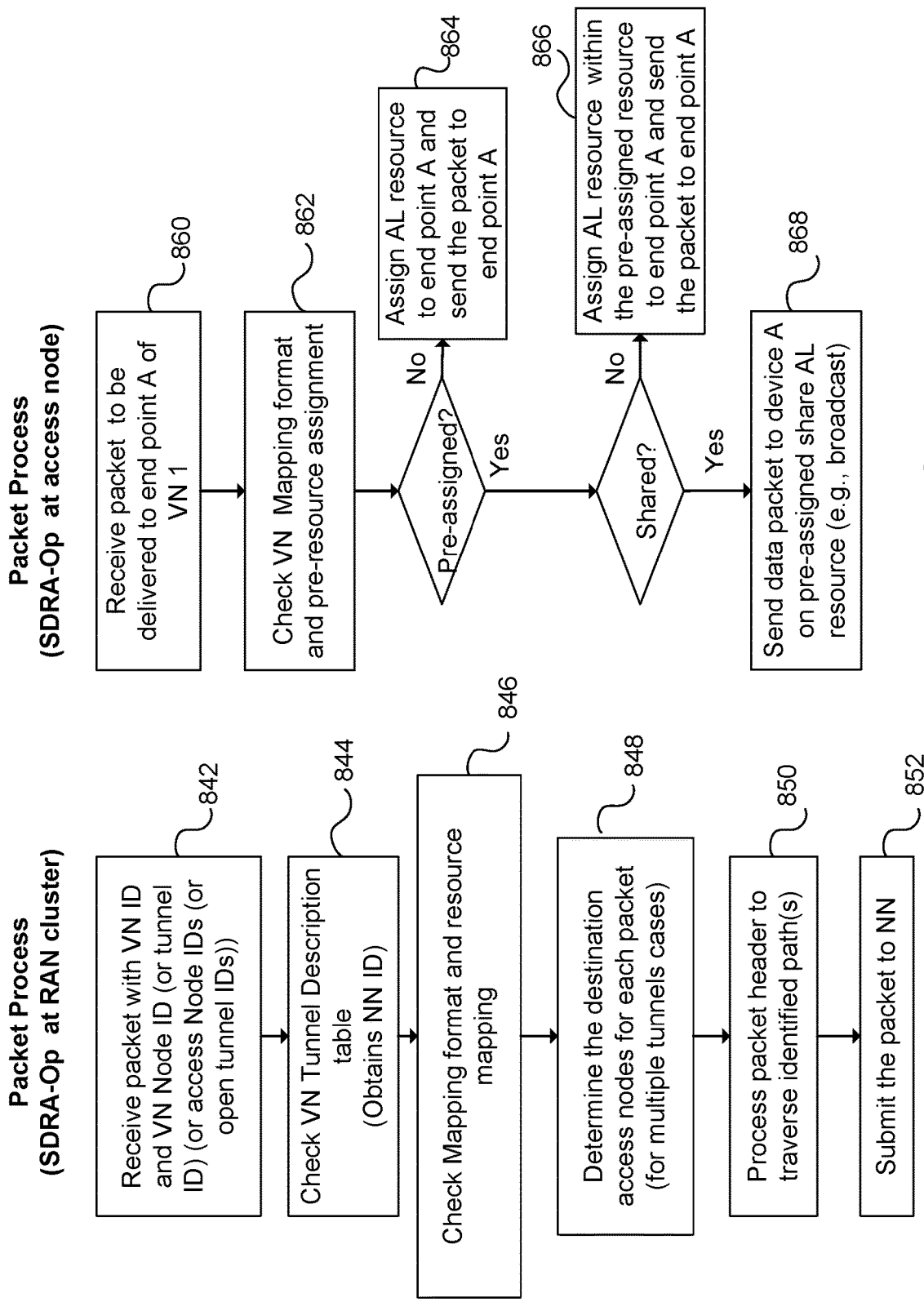

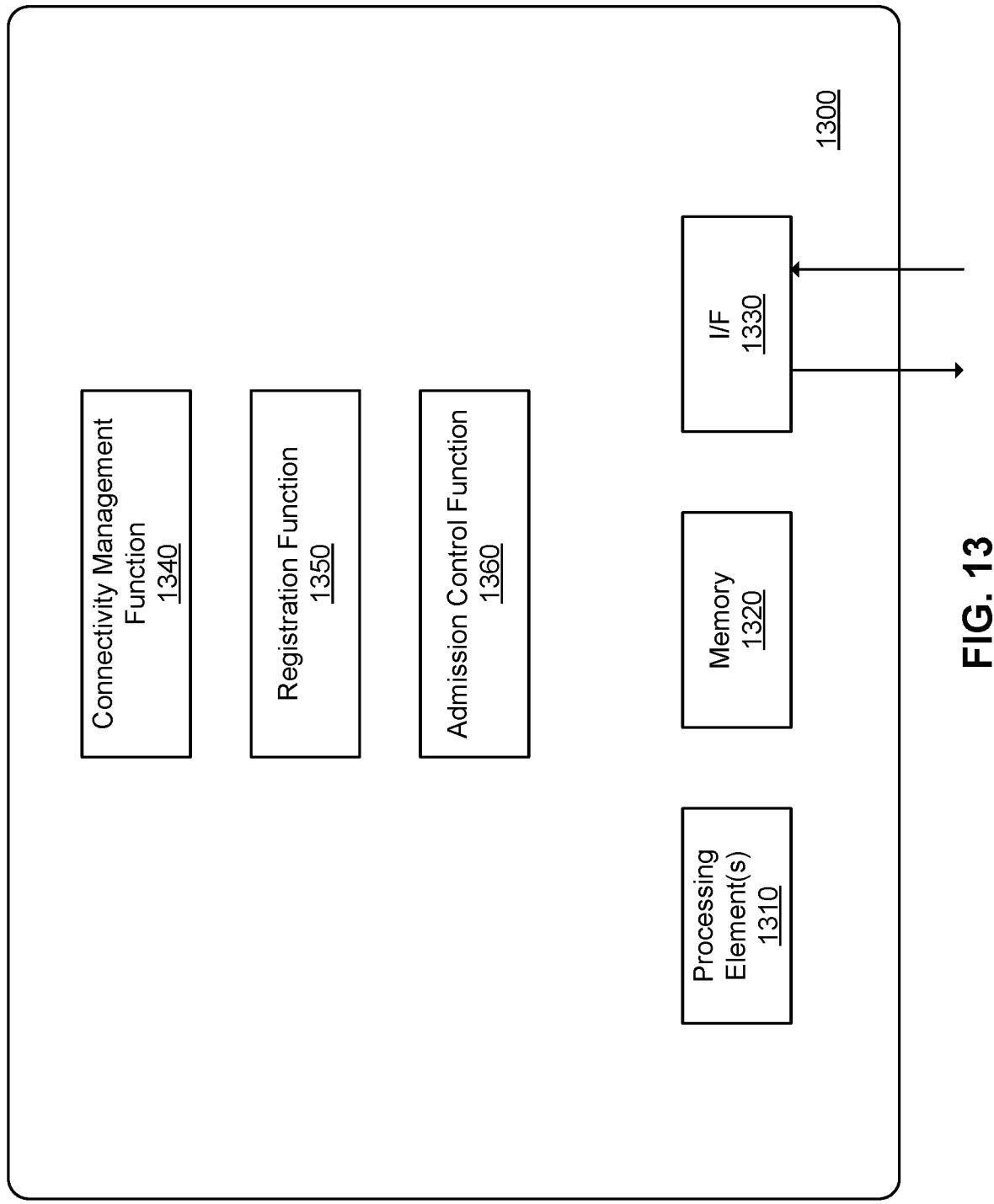

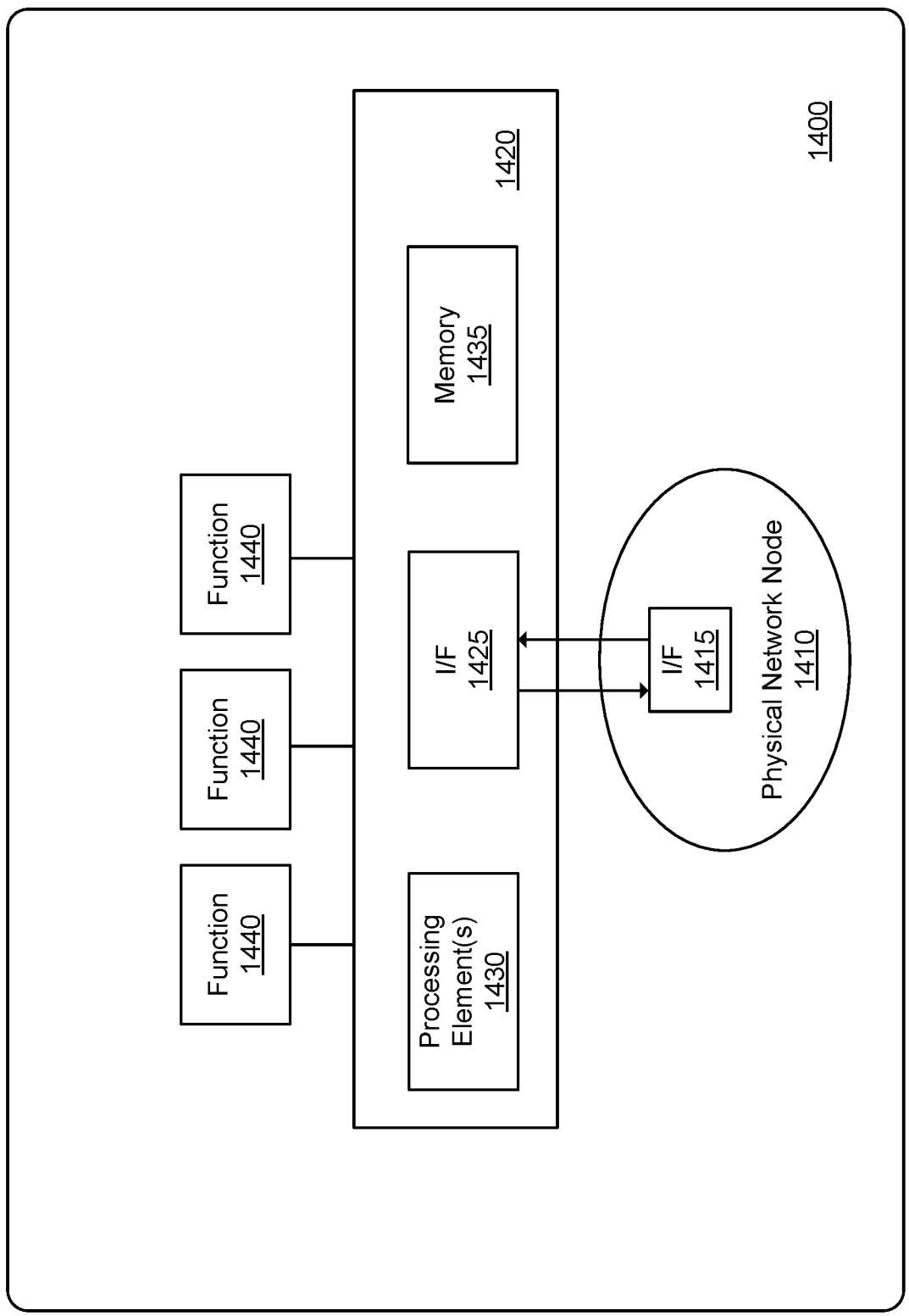

SLICE/SERVICE-BASED ROUTING IN VIRTUAL NETWORKS

CROSS-REFERENCE TO RELATED APPLICATIONS

This application claims priority from U.S. Provisional Patent Application No. 62/371,628 filed on Aug. 5, 2016, to U.S. Provisional Patent Application No. 62/376,820 filed on Aug. 18, 2016, and to U.S. Provisional Patent Application No. 62/399,206 filed on Sep. 23, 2016, all of which are herein incorporated by reference.

FIELD

The present invention pertains to the field of wireless communication networks and in particular to methods and systems for service-based routing in virtual networks.

BACKGROUND

In current 3G/4G networks, traffic is delivered to user equipment (UE) on a per-device session basis between the UE and a service provider, such as a server. A service session is established after completion of an end-to-end connection setup procedure between the UE and the service provider. This connection procedure typically introduces a latency of about 200 ms and causes considerable network overhead on the link between the UE and the service provider.

It is expected that there will be a significant increase in the number of UEs requiring service in next generation networks (e.g. 5G), such as sensors, machines, mobile devices, and other devices that will require connection. Furthermore, the data traffic will likely may become more bursty in nature with a much higher number of sessions to be served as the demand for continuous or near-continuous connectivity increases.

One of the objectives of next generation networks (e.g. 5G networks) is to provide service-based delivery of content, and avoid the overhead of per-device sessions.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments, there is provided a system and method for routing packets through a virtual network, in support of service-based traffic forwarding. According to one embodiment, there is provided a method for routing a data packet toward a destination end point over a virtual network (VN) pre-configured on a network. The method is performed by a virtual router (v-router) associated with a VN node of the VN, and the VN node is associated with a particular physical network node (NN) of the network. The method includes receiving a data packet associated with the VN and specifying a name identifier of the destination end point. The method further includes obtaining a location corresponding to the name identifier. The method further includes obtaining an indication of a destination VN node corresponding to the obtained location. The method further includes obtaining an indication of a next VN node on a pre-configured path between the virtual router and the destination VN node. The method further includes inserting the indication of the next VN node into the data packet to produce a routed data packet. The method further includes submitting the routed data packet to the associated NN for transmission across the network toward the next node.

According to another embodiment, there is provided an apparatus for routing a data packet toward a destination end point over a virtual network (VN) pre-configured on a network. The apparatus includes a virtual router associated with a VN node of the VN, and the VN node is associated with a particular physical network node of the network. The virtual router includes a network interface, a computer processor and a memory. The virtual router is configured to receive a data packet associated with the VN and specifying the destination end point. The virtual router is further configured to obtain a location corresponding to the destination end point. The virtual router is further configured to obtain an indication of a destination VN node corresponding to the obtained location. The virtual router is further configured to obtain an indication of a next node on a pre-configured path between the virtual router and the destination VN node. The virtual router is further configured to insert the indication of the next node into the data packet to produce a routed data packet. The virtual router is further configured to submit the routed data packet to the physical network node for transmission across the network toward the next node.

According to another embodiment, there is provided an apparatus for routing a data packet toward a destination end point over a virtual network (VN) pre-configured on a network. The apparatus includes a plurality of virtual routers each associated with a different VN node of the VN. The VN nodes are each associated with a different physical network node of the network. Each one of the virtual routers includes a network interface, a computer processor and a memory. Each virtual router is configured to receive a data packet associated with the VN and specifying the destination end point; obtain a location corresponding to the destination end point. Each virtual router is further configured to obtain an indication of a destination VN node corresponding to the obtained location. Each virtual router is further configured to obtain an indication of a next node on a pre-configured path between said one of the virtual router and the destination VN node. Each virtual router is further configured to insert the indication of the next node into the data packet to produce a routed data packet. Each virtual router is further configured to submit the routed data packet to the physical network node associated with said one of the virtual routers for transmission across the network toward the next node.

BRIEF DESCRIPTION OF THE FIGURES

Further features and advantages will become apparent from the following detailed description, taken in combination with the appended drawing, in which:

FIGS. 3A, 3B, 3C, 3D, and 3E illustrate an example operation of a VN in relation to the VN routing process for a mobile end point.

FIG. 8C is a process flow diagram illustrating an embodiment of packet processing at a RAN cluster.

FIG. 8D is a process flow diagram illustrating an embodiment of packet processing at an access node.

FIG. 13 illustrates an embodiment of a connectivity manager apparatus.

FIG. 14 illustrates an embodiment of a virtualized apparatus in the network.

DETAILED DESCRIPTION

Figure 1A:
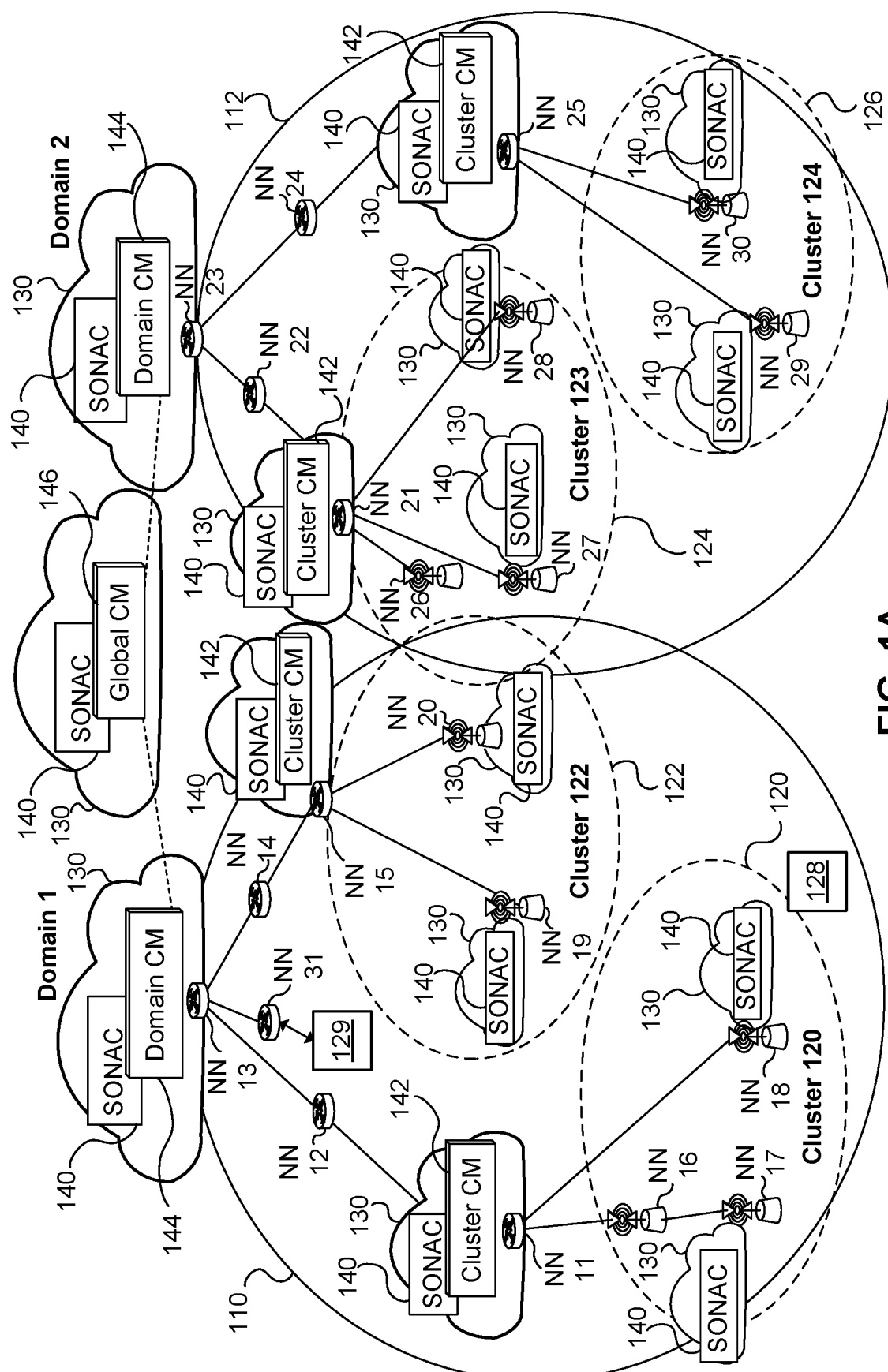
FIG. 1A illustrates a network which is configurable according to embodiments.

As used herein, a communication network (or simply a "network") refers to a collection of communicatively coupled devices which interoperate to facilitate communication between various end point devices, such as User Equipment devices. The term "User Equipment" (UE) is used herein for clarity to refer to end point devices which are configured to communicate with a network either via fixed line connection, or via radios operating according to a predetermined protocol. UEs include UEs as defined by the $3^{rd}$ Generation partnership project (3GPP), mobile devices (e.g. wireless handsets) and other connected devices, including Machine-to-Machine (M2M) devices (also referred to as Machine Type Communications (MTC) devices). A mobile device need not be mobile itself, but is a device that can communicate with a network which is capable of providing communication services as the device moves. A network may include, for instance, at least one of a radio access portion which interfaces directly with UEs via radio access and a fixed line portion which interfaces directly with UEs via fixed line access, in combination with a backhaul portion which connects different network devices of the network together. The network may further comprise various virtualized components as will become readily apparent herein. A primary forward looking example of such a network is a Fifth Generation (5G) network.

It has been proposed that 5G networks be built with various network technologies that allow for the network to be reconfigured to suit various different needs. These technologies can also allow the network to support network slicing to create different sub-networks with characteristics suited for the needs of the traffic they are designed to support. The network may include a number of computing hardware resources that provide processors and/or allocated processing elements, memory, and storage to support functions executing on the network, as well as a variety of different network connectivity options connecting the computing resources to each other, and making it possible to provide service to mobile devices.

A service generally corresponds to a source, or a sink, for specified data communications that is available on the network. Accessing a service may involve communication between multiple end points that are connected to the network. A service may be provided by the network operator, or may be provided by network customer such as a business, utility, government, or other organization. Examples of services include, but are not limited to, providing audio and/or video content to stream or download to an end point such as a UE, storage and/or processing of data from an end point such as a UE, UE-to-UE messaging services, machine-to-machine communications such as utility meter reporting, remote data storage, and/or remote computing services.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources.

As used herein, the term virtual network (VN) refers to a pre-configured network topology including a collection of pre-configured virtual network nodes which are communicatively interconnected to support one or more network slices. The VN is identified by a VN identifier (VN ID). If the VN supports a single network slice (i.e. a single service), that slice may also conveniently be identified by the VN ID. If the VN supports a plurality of network slices, a service identifier (service ID) may be used to differentiate between each of the supported plurality of network slices, to identify which slice is allocated to which service as supported by that VN. The plurality of network slices are logically separated from one another within the VN, but all of the network slices within a VN share a common set of network resources that have been configured for that VN. In this case, a slice can be identified using a combination of a VN ID and a service ID.

More particularly, a VN is composed of a collection of VN nodes each of which is associated with one of a corresponding collection of physical network nodes that make up the network. The VN nodes are communicatively interconnected, either directly or indirectly via other VN nodes. Each VN node is associated with, and communicatively linked to, a corresponding physical network node of the network. In some embodiments, operational capacities of the VN nodes may be co-located with their associated physical network node. In some embodiments, operational capacities of one or more of the VN nodes may be physically separated from their associated physical network node. The VN may further include definitions and functional elements to provide connecting tunnels, associated routing functions, packet aggregation functions, packet de-aggregation functions, firewall functions, anchor point functions, in-network processing elements, admission control, and access link scheduling and management, that is arranged to support the one or more network slices across the collection of VN nodes.

For example, the association may be such that a packet received at a physical network node is provided to the VN node associated with that physical network node for processing (e.g. under predetermined conditions), and packets provided by the VN node may be transmitted by the physical network node as instructed by the VN node, or the pre-configured rules for that VN. The VN nodes can be instantiated using computing, communication, and memory resources such as network function virtualization resources. These resources can be located in a cloud, such as a datacenter or local cloud. The local cloud may include generic hardware proximate or co-located with the associated network node. A VN node may comprise a network function or a group of network functions. The logical topology of a VN refers to the interconnection among multiple VN nodes which are distributed at various associated physical network nodes.

A VN tunnel refers to a logical communication link between two VN nodes. An open VN tunnel refers to a logical communication link between a VN node and another network node which is neither associated with a VN node nor a VN specific network function. The other network node may be, for instance, an edge node of the network, such as an access node or a gateway. Edge nodes provide connectivity for mobile or fixed end points (or "end nodes") to connect to the network. End points may include, for instance, UEs and other devices external to the network, such as application servers, which attach to the VN access the service(s) supported on that VN.

A network entity generally refers to a network node, or a combination of network nodes, that is operative to provide specified services on the network. A network entity comprises physical components, such as processors, allocated processing elements, or other computing hardware, computer memory, communication interfaces, and other supporting computing hardware. The network entity may use dedicated physical components, or the network entity may be allocated use of the physical components of another device, such as a generic computing device or resources of a datacenter, in which case the network entity is said to be virtualized. A network entity may be associated with multiple physical components that may be located either in one location, or may be distributed across multiple locations.

A network function comprises a service that may be provided by a network entity, or may comprise physical components configured in a certain way to provide a given functionality, which may be described in terms of data inputs and outputs. In general, a network entity may be operative to support one or more network functions on the network.

Embodiments provide for delivery of one or more services from at least one network entity available on a network. Rather than the network acting only to connect end points to the network entity, the network is configured to participate in providing the service. In particular, a VN is instantiated and pre-configured on the network for providing delivery of the service(s). The VN is pre-configured in such a way that end points are able to connect to a desired service with limited to no signaling across the network at the time of service usage, and therefore limited latency. This is enabled by the pre-establishment of the VN on the network, which effectively extends the service from the network entity across the network to the point of attachment by the end point. Pre-configuration of edge nodes may also enable this feature. When the end point attaches to the VN, it gains access to the service, without signalling between the end point and the network entity that provides the service.

Because the network participates in service delivery, the service is expanded into the network by the use of virtual network nodes. The virtual network nodes can recognize incoming data packets associated the service and route them appropriately via the pre-established tunnels.

The pre-configured VN is operative to recognize incoming data packets associated the service and to route them appropriately via the pre-established tunnels. This operation is supported by VN routing functions (v-routers) and VN tunnels which are established for providing the service. The VN nodes can also perform other functions of the service such as packet aggregation and de-aggregation, firewall functions, anchor point operation functions, in-network processing and data storage, admission control, and access link scheduling and management.

The v-routers are configured to route packets between the VN nodes via the tunnels, in a hop-by-hop (tunnel-by-tunnel) manner. Packets are routed toward an appropriate destination, such as but not necessarily limited to a destination specified in the packet using a destination ID. Physical network resources, such as network nodes, are configured to provide the VN tunnels as part of the VN tunnel definition. VN tunnels can be supported by a chain of physical network nodes which are configured to forward tunneled packets toward the VN tunnel egress. In some embodiments, each physical network node supporting a tunnel may be configured with a set of routing rules which associates a VN tunnel identifier or destination network node identifier with a next network node. When a packet specifies the VN tunnel identifier or destination network node identifier, it is forwarded to the associated next network node.

For example, when the service involves processing of data transmitted by UEs in a certain manner, and providing results of this data processing to the UE or another UE, some or all of the processing may be done at virtual network nodes proximate to the network edge, thereby reducing service latency. The location of VN nodes performing in-network data processing and/or data caching can be selected based on criteria such as but not limited to: performance, cost, latency, communication overhead, and quality of service.

In various embodiments, the pre-configuration of the VN provides a network infrastructure that stands ready to handle packets according to a requested service. This allows end points to reduce signaling because the details of how the packet is to be treated are specified in advance when the VN is pre-configured. This also allows for lower latency, because tunnel set-up, service function set-up, end point tracking, etc. are performed in advance. Each VN node is in standby across the network ready to receive and handle any packets directed to a service supported by that VN. In addition, because service functions can be embedded in the network (even possibly at the edge nodes or in radio access network (RAN) clusters), data forwarding and associated latency and network resource usage can be reduced.

Network pre-configuration may be performed by a network entity referred to as a Service Oriented Network Auto Creation entity (SONAC). The SONAC is described for example in Zhang, Hang, et al., "5G Wireless Network: MyNET and SONAC", IEEE Network Volume: 29, Issue: 4, July-August 2015, pp 14 to 23, which is incorporated herein by reference. The SONAC may perform and/or direct underlying network resources to instantiate and configure the VN as described herein. As used herein, SONAC functionalities can be subdivided into functions used for network slice composition, referred to as SONAC-Com, and functionalities used for network slice operation, referred to as SONAC-Op. The SONAC may comprise operations for performing software-defined topology definition (SDT), software-defined resource allocation (SDRA), and software-defined protocol definition (SDP). SDT, SDRA and SDP in support of SONAC-Com and SONAC-Op are referred to as SDT-Com, SDRA-Com, SDP-Com, SDT-Op, SDRA-Op and SDP-Op, respectively. SONAC-Op may be dedicated to managing a single network slice, or common to multiple network slices managed thereby. SONAC-Op may be supported on its own network slice or on a network slice used to support multiple entities. The concept of network slices provides operators the flexibility to provide network infrastructure resources that may be tailored to satisfy the wide variety of customer service and quality requirements.

The present application describes a "Hop-On" concept which allows end-point devices (e.g. UE) to connect and disconnect from the slice (VN) directly, rather than needing to complete end-to-end connections as is presently the case. This significantly simplifies the data traffic delivery procedure and reduces signaling overhead and latency across the network. In the Hop-On VN traffic delivery system and method, access to a service does not require per-UE per-session establishment, and does not require end-to-end connection setup between the UE and the service provider. There is no session setup as the session is effectively "pre-existing" as a VN slice pre-established on the network. The VN slice supported by a pre-defined VN topology configured on the network. The UE only needs to negotiate its entry or exit from the slice which may occur at a localized level (e.g. at the edge of the VN). The connection between the slice access point and the service provider is established and maintained by the control functions managing the slice.

Slicing and Hop-On together enable:
Scalability—Physical Network Nodes (NNs) are operative on the service level (integrated data traffic of a service), instead of on device/session level
Simplicity—Per device/session end-to-end tunnel establishment is removed or minimized
Flexibility—service-customized VN/slice—allows the communications network to be adjusted for individual services, to provide a best fit for the needs of customers and network operators For example, end-points of a VN designed for such services can hop-on the VN by sending data packets using a pre-assigned Access Link (AL) resource for that VN. The end-point UE can register and connect with a local node at the edge of the VN, rather than the destination end point of their communications. Once data packets for a service are submitted to the network, the packets are routed to the intended destination(s) along pre-defined VN tunnels, and can be separated by service or QoS as required. For VNs where there is no pre-assigned AL resource, a simplified set of signaling message exchanges on the AL may be used to enable data packet transmission over the AL. From the point of view of communicating devices, the network is always ready to receive and deliver data traffic.

Once the VN has been established, data traffic delivery to a mobile UE relies upon the selection of the right tunnel(s) when routing the data traffic, instead of the re-establishment of new per-device end-to-end connections. Accordingly end points, such as UE or business customers, are able to exchange traffic with a local NN without regard for the location of the intended recipient, or the condition of the network between the sender and the recipient. Similarly, NNs located logically distant from the destination end point do not need to know the logical or physical address of the destination end point. Instead, these NNs need only follow the pre-defined rules for handling packets and direct the packets to an assigned NN that is operative to maintain or obtain the current location of the destination end point.

When communicating to mobile UE, one or more tunnels connecting Access Points (APs) of a Radio Access Network (RAN) cluster can be selected by a v-router at the cluster level to selectively enable data delivery to the one or more APs. Accordingly, the decision-making regarding the best mode to reach a recipient UE may be decided at the lowest level which has the most accurate position and mobility information related to the recipient UE. With this functionality, true handover-free service access is enabled. The end-points of the communication can communicate with a correspondent party using a name (UE ID and a service ID) in place of location information. The hierarchical VN architecture enables the v-routers to handle the traffic on an end-point name basis, and access name-based location tracking and resolution from the CM's configured for that VN.

By using a pre-defined VN, data packets from specific applications, such as peer-to-peer communication (e.g. wechat), can be directly routed to the destination end point via efficient tunnel routing, i.e., shortest route without going through un-necessary paths. CM techniques provide the location information to VN routers to enable the efficient data delivery.

From the end point (e.g. UE or server) perspective, the hop-on process starts with network registration: to obtain authentication and authorization to use the network, followed by registration to a CM slice to start reach-ability operation to enable the network to track the end point's location. The location tracking may be initiated before the end point is registered to a user plane (UP) of the VN (slice). The next step is registration to a UP slice to authorize the end point to use the UP slice and obtain information on any requirements for admission control (AC) for follow-up service data transmission. If no further AC is required, the end-point can Hop-On, or access, the slice to directly send data over the VN. For most MTC cases, the above procedure can be simplified. If further AC is required for a service, before sending any data traffic an AC procedure is needed (e.g. for some bulk data transmission over a slice with limited VN capacity, an AC is needed before access is provided to the slice).

Embodiments relate to the interactions between an end point, such as a UE, computing device, or customer server, and an edge node, such as an access point of a radio access portion of a communication network. In some embodiments, the end point may be a server or other networked device, and the corresponding edge node may be a gateway of the communication network. Some embodiments provide for an end point or method of operating same, while other embodiments provide for an edge node or method of operating same. The interaction between edge nodes and end points supports VN operation, so as to allow end points to access the VN and to convey packets between the end points and the VN.

FIG. 1A illustrates an example of a network infrastructure which may be configured and utilized according to some embodiments. It should be understood that this network infrastructure and its topology is used as an example only, and is not intended to limit the present invention.

To assist with tracking the location of UE accessing the network, the network can be divided into domains, such as Domain 1 110 and Domain 2 112 illustrated in FIG. 1A. Each domain may be further sub-divided into RAN clusters

120, 122, 123, 124. For expediency, FIG. 1A illustrates two domains and two hierarchical layers, namely a domain layer and a cluster layer, however other embodiments may include various numbers of domains and more or fewer layers, as may be applicable for a particular network. The specific domain division and sub-division may be implementation-specific and based on network requirements.

FIG. 1A illustrates multiple physical network nodes (NNs) labelled NN 11 to NN 30. FIG. 1A further illustrates multiple network entities which are provided in the form of VN functions supported by computing resources 130. The network entities 140, 142, 144, 146 are instantiated using the computing resources 130 such as reconfigurable in-network resources, or cloud or datacenter resources. The computing resources 130 may comprise, for instance, a data center, server, or virtualized cloud resources available to particular NNs. Generally, VN nodes are associated with a corresponding computing resource 130, and accordingly physical nodes that are not allocated computing resources 130 would not be allocated as VN nodes.

The illustrated network entities include SONAC entities 140 and CM entities including cluster CM entities 142, domain CM entities 144 and a global CM entity 146. Each network entity 140 to 144 may associate with the network node at which it is located. The global CM entity 146 may associate with another network node (not shown), or may be supported as a separate management node that manages and directs operations in the two Domains 110, 112.

The SONAC architecture formed of SONAC entities 140 is used for pre-configuring and managing VNs which include VN nodes associated with at least some of the network nodes. The SONAC may also manage operations of the physical network nodes NN 11 to NN 30. The interconnections between SONAC entities at different layers of the architecture are not shown for the sake of clarity. SONAC-Com functions supported by the SONAC entities 140 and CM functions supported by the CM entities 142, 144, 146 can be pre-realized before any service slice is defined and implemented. SONAC-Op can be pre-realized if it controls and manages all slice operations. Alternatively, a SONAC-Op can be created together with a service slice if the SONAC-OP is dedicated to that service slice.

The network infrastructure further includes a hierarchical connectivity management (CM) entity formed of CM entities 142 to 146. The interconnections between CM entities at different layers of the architecture are not shown for the sake of clarity. The CM entity may be configured to track current locations of end points such as UEs, and to provide such location information to network nodes and/or SONAC components as required.

The network infrastructure further includes RAN clusters 120, 122, 123, 124, 126, which include multiple radio access network nodes ("access nodes") in a common area. The access nodes in the RAN cluster are interconnected via wired or wireless communication links. Alternatively, at least some access nodes may be provided in a non-clustered configuration. The access nodes may each include their own full or partial baseband processing infrastructure, and some or all of the baseband processing infrastructure may be shared by multiple access nodes. The access nodes may be provided with or without computing resources 130, or may share a set of computing resources 130 made available to multiple access nodes. RAN clusters can be used as part of the VN. Further, packets may in some cases be wirelessly transmitted to and from RAN clusters using multipath, multicast or broadcast transmissions.

Network node NN 31 is illustrated as an example of an edge node which is not part of a RAN cluster. NN 31 may be, for example, a gateway which is connected to the Internet or another external communication network. Further illustrated is an end point 128 such as a UE which wirelessly communicates with one or more of the edge nodes NN 16, NN 17 and NN 18 in RAN cluster 120. Further illustrated is an end point 129 such as a server, which communicates with the edge node NN 31, for example via the external network. Due to mobility, end point 128 may enter cluster 122 and connect to one or more associated edge nodes, such as NN 19 and/or NN 20.

Figure 1B:
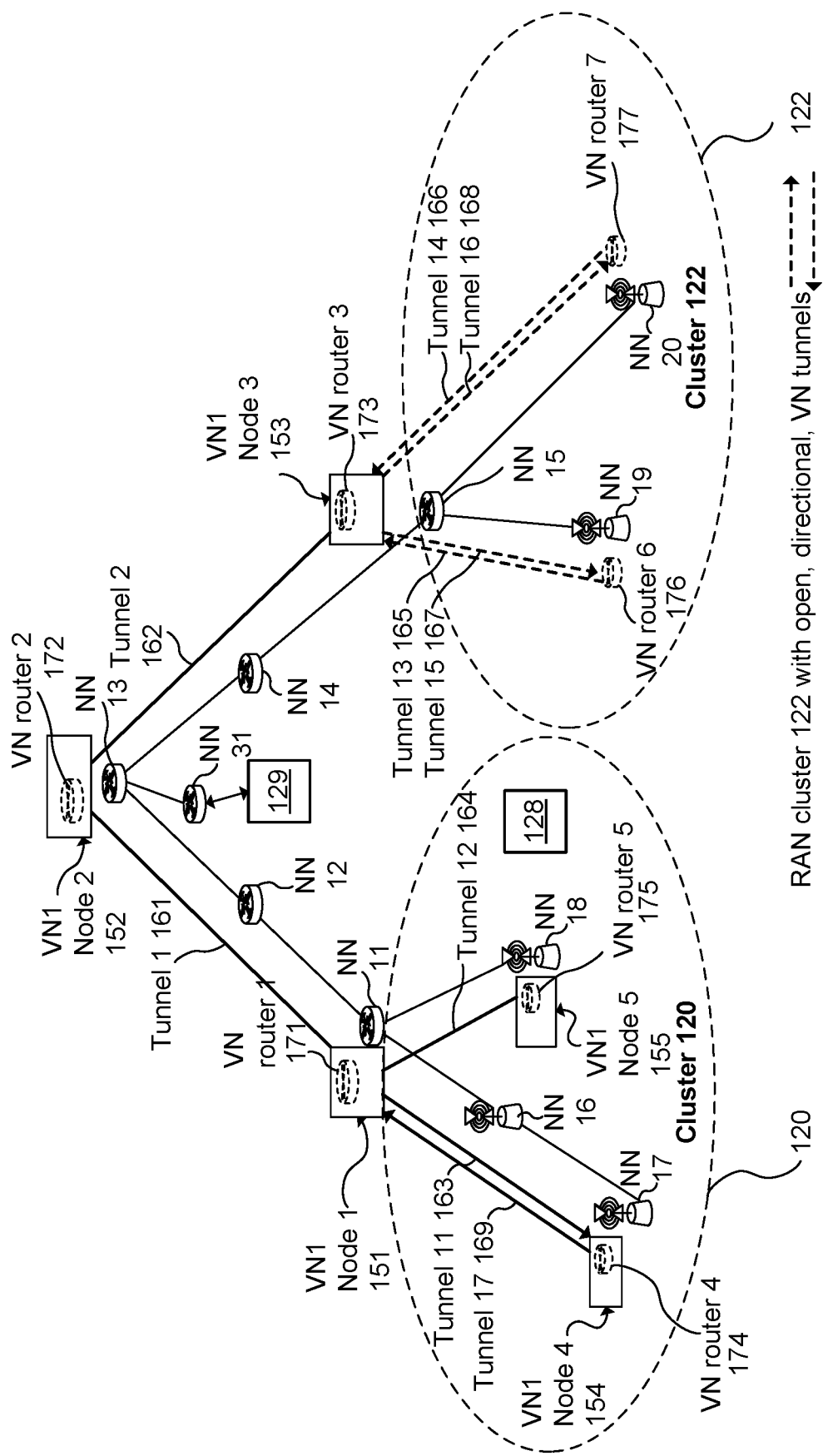
FIG. 1B illustrates configuration of a network according to embodiments.

FIG. 1B, illustrates a VN having VN ID equal to one. This VN is referred to as VN1, to illustrate that multiple VNs may be supported. VN1 Nodes 1 to 5 151, 152, 153, 154, 155 are each associated with a corresponding one of the NNs. For instance, VN1 Node 1 151 associates with NN 11 and cluster 120, VN1 Node 2 152 associates with NN 13 and may further be assigned a cluster ID of 121 to indicate that it is outside of both cluster 120 and cluster 122, VN1 Node 3 153 associates with NN 15 and cluster 12, VN1 Node 4 154 associates with NN 17 (an access node) and cluster 122, and VN1 Node 5 155 associates with NN 18 (an access node) and cluster 120. The VN logical topology, including VN nodes and VN tunnels, is illustrated on top of the network infrastructure of physical network nodes and communication links.

VN tunnels 161, 162, 163, 164, 165, 166, 167, 168, 169 connect VN1 Nodes 1 to 5 151, 152, 153, 154, 155. For instance, tunnel 1 161 has an ingress at VN1 Node 2 152 and an egress at VN1 Node 1 151, tunnel 2 162 has an ingress at VN1 Node 2 152 and an egress at VN1 Node 3 153, tunnel 11 163 has an ingress at VN1 Node 1 151 and an egress at VN1 Node 4 154, and tunnel 12 164 has an ingress at VN1 Node 1 151 and an egress at VN1 Node 5 155. VN tunnels may be bi-directional, such as tunnel 1 161, or uni-directional, such as tunnel 11 163.

V-routers 1 to 5 171, 172, 173, 174, 175 are instantiated and each associated with one of VN1 nodes 1 to 5 151, 152, 153, 154, 155. V-routers 6 & 7 176, 177 and labelled as "VN routers 6 and 7" are instantiated and associated with network nodes NN 19 and NN 20, respectively. The v-routers may be instantiated using cloud-based or datacenter-based resources, for example. In some embodiments, v-routers may be instantiated at least partially using resources which are co-located with the physical network nodes.

The VN may support at least one service slice. In cases where a plurality of service slices are supported, an additional service identifier (service ID) may be used to differentiate between service slices handled by that VN. In the case where only one service slice is supported by the VN, then the service identifier can be omitted as the VN ID inherently identifies the service slice supported by that VN. End points are able to reduce signaling, because rather than specifying details of how the packet is to be treated, the service identifier (e.g. derived from packet characteristics) is used to trigger packet handling according to the service. This also allows for lower latency, because tunnel set-up, service function set-up, end point tracking infrastructure establishment, etc. are performed in advance, such that end points know handle to traffic directed toward a specified service. In addition, because service functions can be embedded in the network (even possibly at the edge nodes or in RAN clusters), data forwarding and associated latency and network resource usage can be reduced.

Embodiments provide for a method and apparatus for routing data packets through a network. A virtual network (VN) is instantiated within the network such that a subset of the network nodes are associated with VN nodes. Logical tunnels between selected pairs of VN nodes are defined as part of the VN. Virtual network virtual routers (v-routers) are associated with some or all of the VN nodes. Each v-router is configured to route packets, received at the VN node and corresponding to a service supported by the VN, onto an appropriate one of the logical tunnels having ingress at the VN node. A logical tunnel having its ingress at a first VN node and its egress at a second VN node can be implemented by a set of network nodes of the communication network which forward appropriately marked data packets in a hop-by-hop manner from a network node associated with the first VN node toward another network node associated with the second VN node.

It is noted that the logical tunnels and the v-routers are provided prior to an end point requests usage of the VN, according to a service. In some embodiments, the logical tunnels and the v-routers are provided prior to the VN being assigned to support a service. This is in contrast to existing approaches, which establish communication session paths between end points in response to a request for serving a particular end point device.

Some embodiments additionally or alternatively comprise routing data packets via open logical tunnels having ingress at a given VN node, but having a tunnel egress that is unspecified. Some embodiments additionally or alternatively comprise routing data packets via open logical tunnels having egress at a given VN node, but having a tunnel ingress point that is unspecified.

Figure 2:
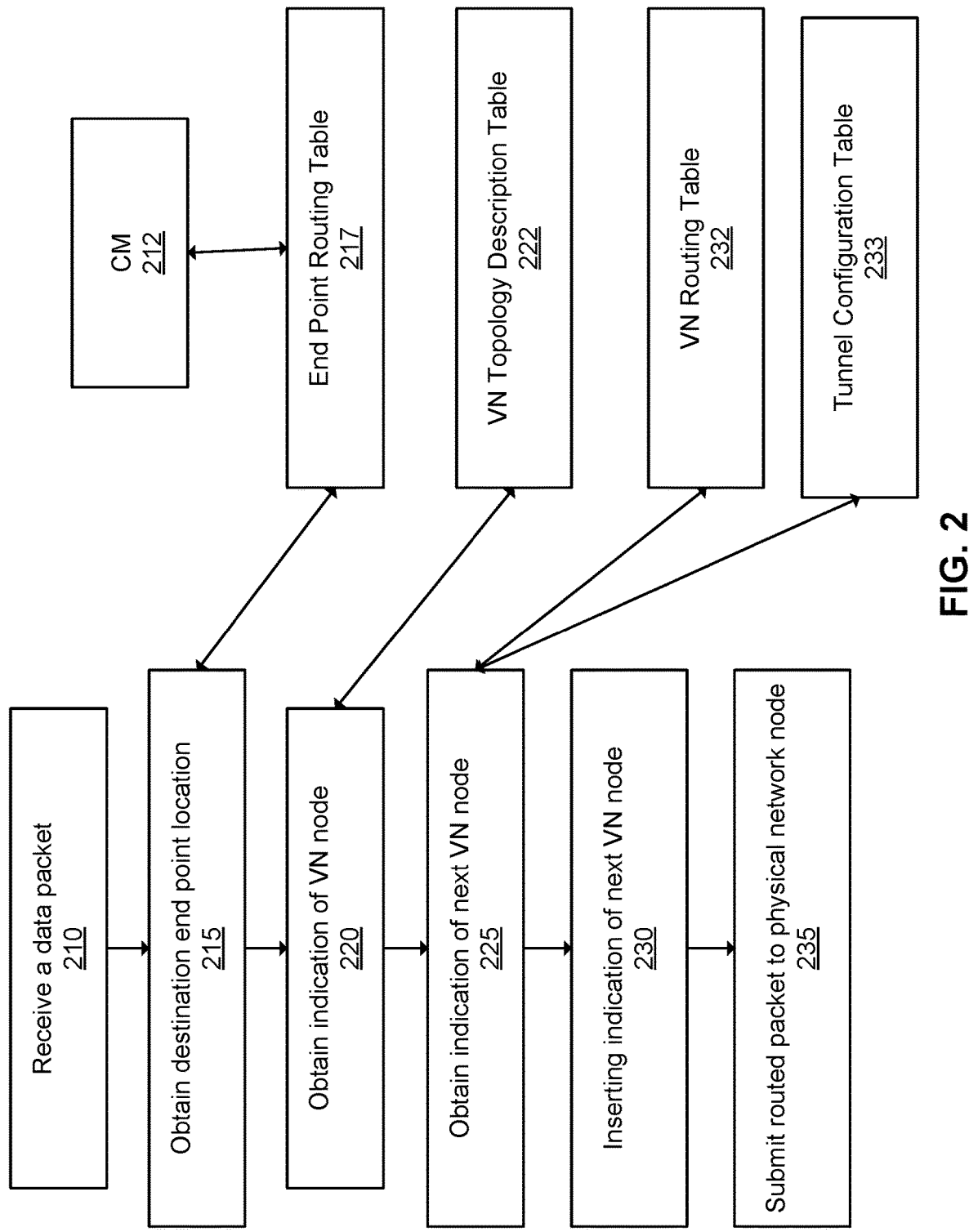
FIG. 2 illustrates a process flow diagram indicating an embodiment of operations for routing a data packet toward a destination end point over a virtual network.

Having reference to FIG. 2, embodiments provide operations for routing a data packet toward a destination end point over a virtual network (VN) pre-configured on a network. The VN may be operated in support of a particular service with which the data packet is associated. The routing is performed by a virtual router (v-router) associated with a VN node of the VN. The VN node is associated with a particular physical network node of the network. The operations include the virtual router receiving 210 a data packet associated with the VN. The destination end point may be specified explicitly in the data packet by including a name identifier (i.e. a name ID) corresponding to the destination end point in the packet header. The operations include the virtual router obtaining 215 a location corresponding to the destination end point as identified by the name identifier. The location may be obtained via a lookup operation performed on an end point routing table 217 which correlates end point name identifiers with current logical locations available on the VN. The end point routing table may be dynamically updated via communication with a CM 212 or other network entity which tracks locations of registered end points. The operations include the virtual router obtaining 220 an indication of a destination VN node corresponding to the obtained location. The indication of the destination VN node may be obtained via a lookup operation performed on a VN topology description table 222. The operations include the virtual router obtaining 225 an indication of a next VN node on a pre-configured path between the VN router and the destination VN node. The indication of the next node may be an identifier of a next VN node on the path, or an identifier of the physical network node which is associated with such a next VN node. In some embodiments, the indication of the next VN node is obtained via a lookup operation performed on a VN routing table 232. In some embodiments, the indication of the physical network node associated with the next VN node is obtained via a lookup operation performed on a tunnel configuration table 233.

The operations include the virtual router inserting 230 the indication of the next VN node into the data packet to produce a routed data packet. The operations include the virtual router submitting 235 the routed data packet to the physical network node (associated with the current VN node) for transmission across the network to the next node (e.g. the physical network node associated with the next VN node). As such, based on a name or ID of the destination end point, and the acquired location information, the v-router will route the data packet to an appropriate next tunnel or next VN node.

In some embodiments, the physical network node forms the first node in a set of network nodes which ends at an end node, which is the next physical network node associated with the next VN node. The set of network nodes may also include one or more intermediate network nodes between the first node and the end node. The set of network nodes may be a chain of nodes, each of which forwards the data packet in a hop-by-hop manner, or a more complex network structure including one or more parallel paths. The set of network nodes operates to provide a logical tunnel between the VN node and the next VN node. The set of network nodes forwarding the packet may thereby implement a logical tunnel.

The above-described tables are stored in memory locations which are accessible to the v-router, for example in local computer memory or computer memory of a datacenter or set of cloud resources which also house computer processing facilities of the v-router.

Embodiments provide for a method for routing a data packet in accordance with the operations described with respect to FIG. 2. Other embodiments provide for a v-router configured to perform the operations described with respect to FIG. 2, or a VN node having such a v-router, or more generally a functionality associated with a network node which performs such operations. For example, a network node may be configured, through local or remote configurable computing or packet processing resources, to operate as described with respect to FIG. 2.

Embodiments provide for operation of a network of interconnected v-routers at a respective plurality of interconnected VN nodes, to route a data packet toward an end point, specified in the packet, in accordance with a service supported by the VN. At least one of the v-routers operates as described with respect to FIG. 2. In various embodiments, once one of the v-routers obtains some information, such as a location corresponding to the destination end point and/or a destination VN node, this information can be inserted into the data packet, and v-routers which subsequently handle the data packet can obtain the information, if necessary, from the data packet. Plural v-routers each handle the data packet in turn, in a hop-by-hop manner, to forward the data packet toward the destination end point.

In some embodiments, following location registration, the v-routers of the VN are configured to create an entry (associated with the registered end point) in an end point routing table held thereby. The entry includes current routing information for the end point, associated with the end point name identifier (name ID). Information may include, for example, a service identifier such as a VN ID and/or service ID, end point name ID, and an identity of a next VN node to use for routing packets toward the end point via the VN. In the examples provided below, the VN supports a single service, and accordingly the VN ID can also serve as a service ID (i.e. the service is identified by referring to the VN ID). In embodiments where a VN supports multiple services, then the combination of a VN ID and a service ID would be required to identify a particular service (i.e. the service is identified by referring to the combination of VN ID and service ID).

FIGS. 3A, 3B, 3C, 3D, and 3E illustrate an example operation of a VN in relation to the VN routing process for a mobile end point. In this example, v-router 1 is to forward data packet to destination end point device B which is associated with VN Node 2. V-router 1 checks its end point routing table and determines that the next VN node ID=2. The v-router inserts VN ID and VN node ID to the packet and submits the packet to SDRA-Op for handling.

Figure 3A:
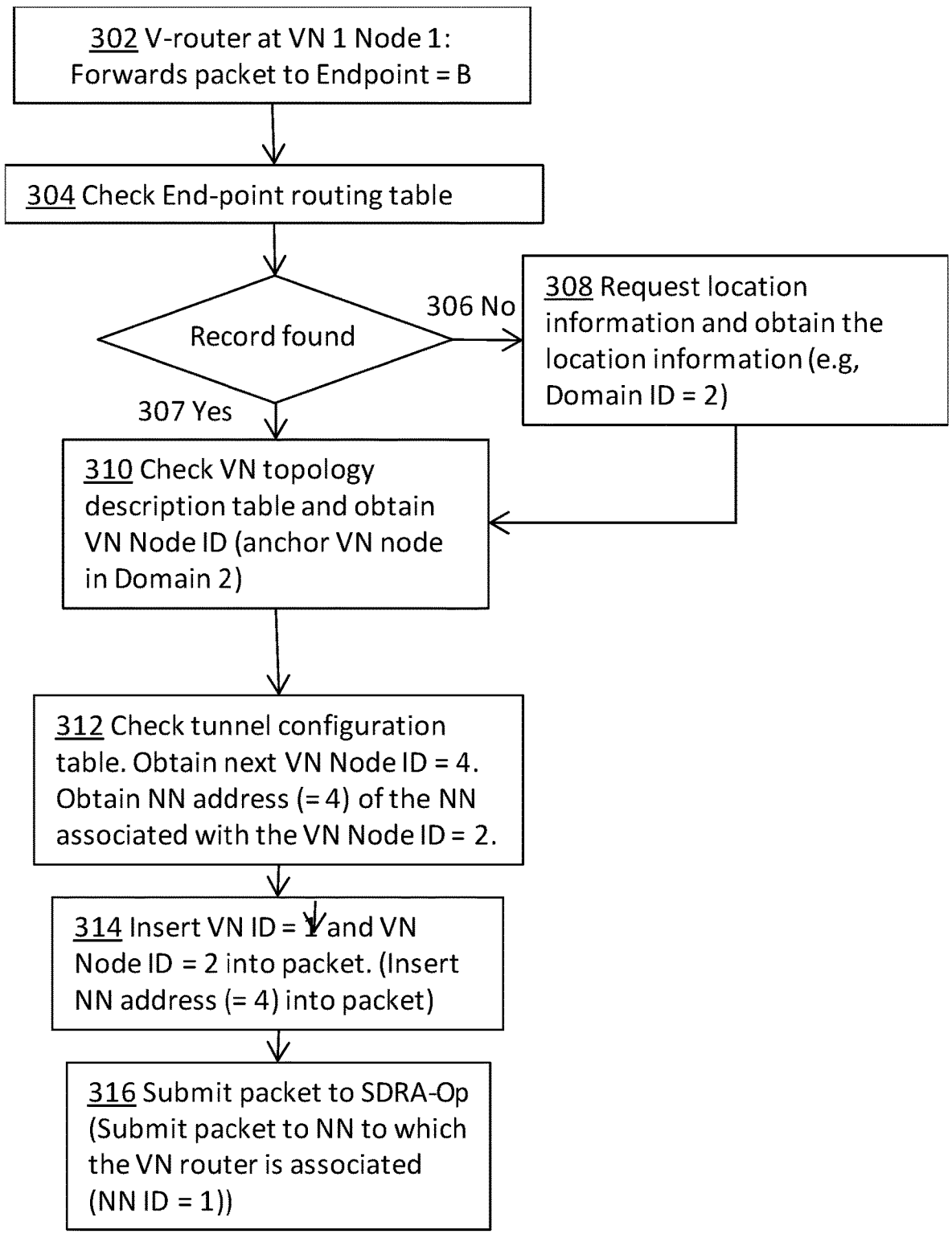

FIG. 3A illustrates operation of a v-router according to an embodiment. FIG. 3A is described in relation to the embodiment of virtual router and virtual node layout in relation to an exemplar physical layout of network nodes depicted in FIG. 3E. The v-router 562 labelled "VN 1 Router 1" and located at VN 1 node 1 352 (see FIG. 3E) is presented with a task 302 to forward a packet to a destination end point with name ID "end point B". To execute this task, the v-router checks 304 an end point routing table accessible thereto, for a record associated with this end point. If a record is not found 306, then the v-router 562 transmits a request 308 for location information to a CM entity 380 (see FIG. 3E), and obtains a response including location information for end point B. Otherwise, if a record corresponding to end point B is found 307 in the end point routing table, the location information request 308 can be omitted. The location information may be, for example, an identity of a network domain (e.g. "Domain ID=2" via which end point B is currently accessible.

Figure 3E:
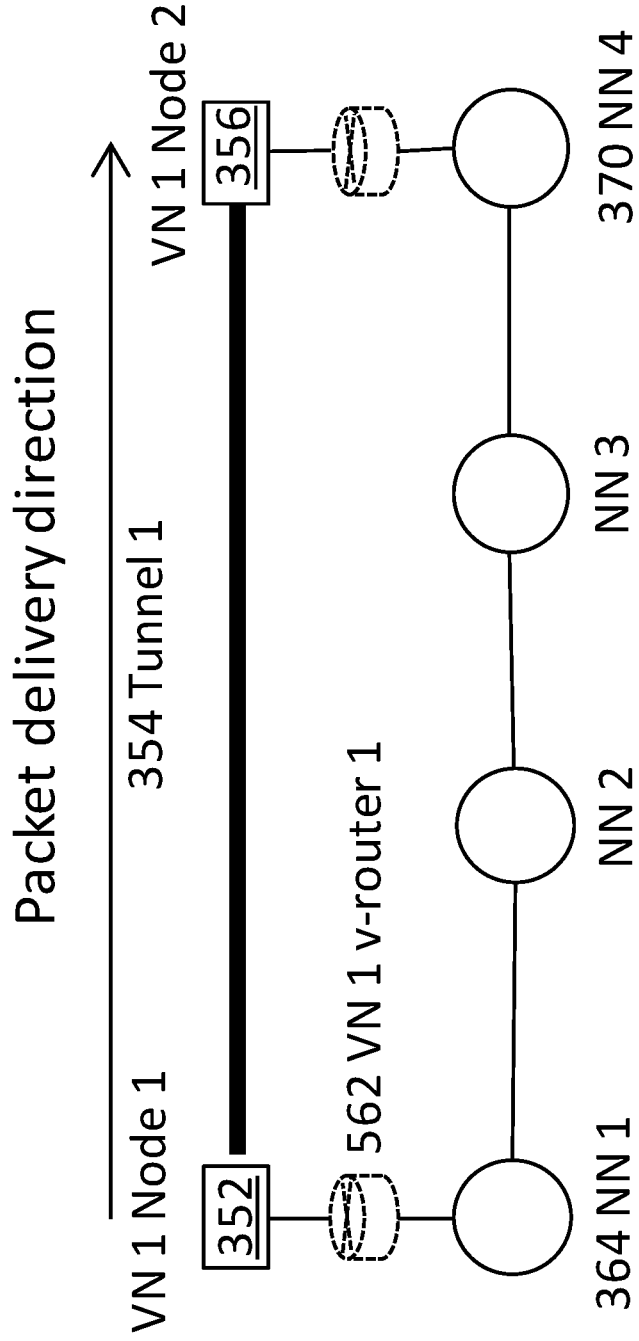

Next, the v-router 562 checks 310 a VN topology description table accessible thereto, and obtains the identity of a VN node, such as an anchor VN node, which is also associated with the obtained location information, and which is therefore usable to route packets toward end point B. In the present example, the anchor VN node is accorded identity "VN Node 2" 356 (see. FIG. 3E). Next, the v-router 562 checks its tunnel configuration table and obtains the identity of the next VN node, the identity of the tunnel to use to forward the packet toward VN Node 2 356, and/or the network-level address of the network node associated with VN Node 2 356 (i.e. NN 4 370). In the present example, because VN 1 Node 1 352 is directly connected to VN 1 Node 2 356 via a single logical tunnel 354 of VN 1, the next VN Node is also equal to the destination VN Node 2 356.

Next, the v-router 562 configures the packet for transmission, for example by inserting 314 the VN ID and next identity of the next VN node (VN Node 2 356) into the packet, and/or by inserting the network-level address of the network associated with VN Node 2 (NN 4 370) into the packet. The v-router then submits 316 the packet for forwarding by the appropriate logical tunnel 354, for example by submitting the configured packet to SDRA-Op, or by submitting the packet to the network node to which the v-router 562 associates (i.e. NN 1 364).

FIG. 3B illustrates an end point routing table 320 held by the v-router 562, according to an example embodiment. The table holds location information for end points as obtained by the v-router, for one or possibly more VNs supported by the v-router.

FIG. 3C illustrates a VN topology description table 330 held by the v-router 562, according to an example embodiment. The table holds, for one or possibly more VNs supported by the v-router, associations between domain identifiers descriptive of potential end point locations and VN node IDs usable to communicate with end points in such locations.

FIG. 3D illustrates a logical tunnel configuration table 340 held by the v-router 562, according to an example embodiment. The table holds, for one or possibly more VNs supported by the v-router, associations between destination VN nodes and next-hop information for routing packets toward such destination VN nodes. The next-hop information may indicate a next VN node along a path to the destination VN node, a next logical tunnel along the path, and/or the network-level address of the network node to which the next VN node along the path associates.

The operations described above with respect to FIGS. 3A to 3E can be varied in several ways. Generally, the v-router, having a packet to forward to an identified destination and via a designated VN, obtains (from the CM or from its internal end point routing table), location information for the destination. The v-router combines the location information with other stored information indicative of the (relatively static) topology and configuration of the VN, and forwards the packet via the VN based on the combined information. This may include determining another node of the VN network which is closer (in the VN topology) to the destination's location, and forwarding the packet toward said other node via logical tunnels of the VN.

Figure 4:
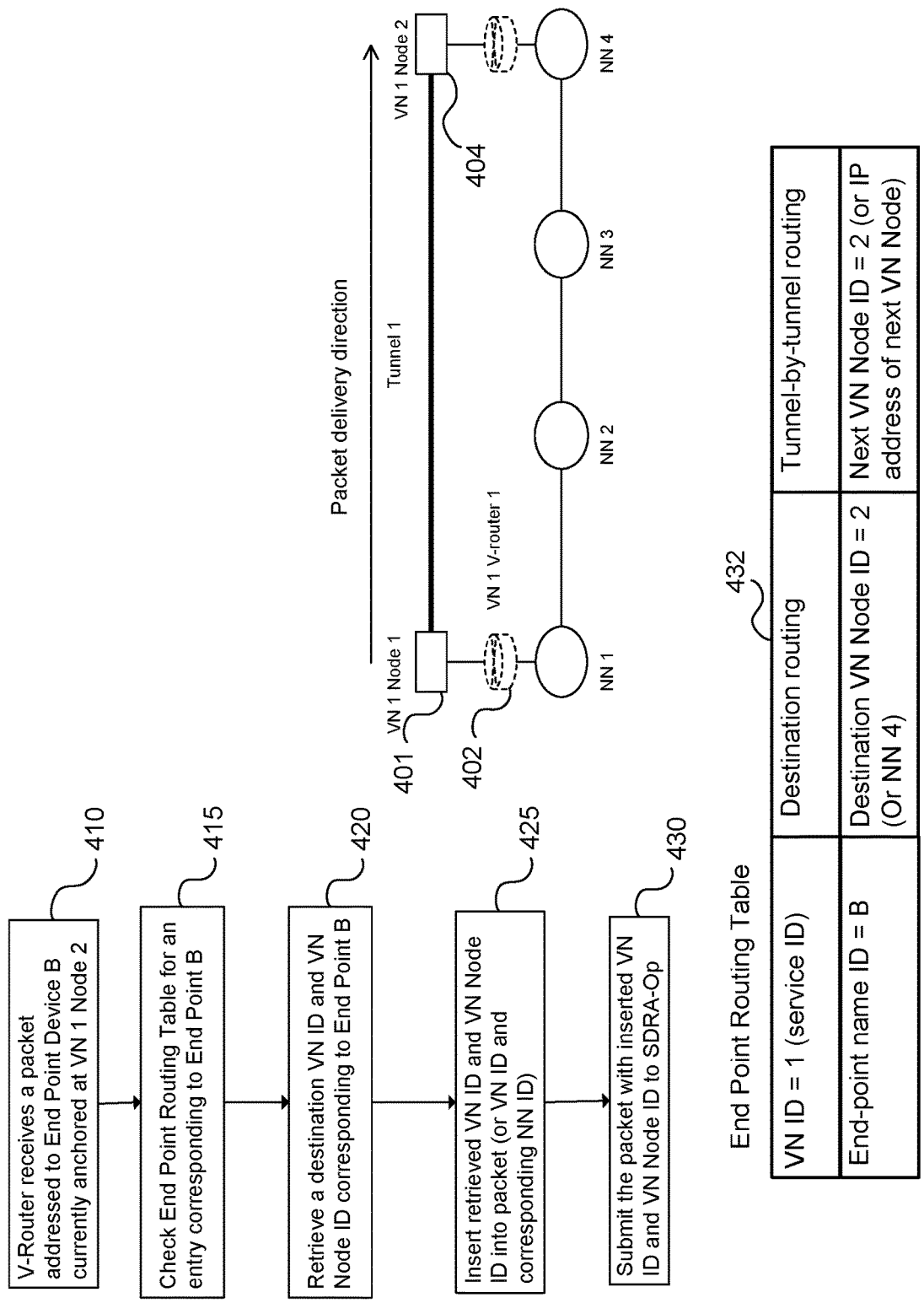
FIG. 4 illustrates an example operation of a v-router.

FIG. 4 illustrates operation of a v-router (V-router 1) 402 associated with a first VN Node 1, according to another embodiment. The v-router 402 receives 420 a packet for forwarding to a destination end point named Device B. The name identifier Device B of the destination end point may be provided in the packet but not necessarily its location. VN 1 Node 2 404 is the current anchor node for Device B, and is both the next VN node and the destination VN node from VN Node 1 401. The v-router 402 checks 415 its end point routing table and retrieves 420 a location for Device B in the form of a location identifier, i.e. a destination VN ID/service ID and a destination VN Node ID. Alternatively, the location identifier may comprise the destination VN ID/service ID and the NN ID of the NN associated with the destination VN Node. In this implementation, the NN is operative to forward received data packets including the VN ID/service ID to the associated VN Node for processing. The obtained location may be an identity of VN 1 Node 2 404 as the anchor node for the destination end point Device B. The v-router 402 inserts 425 the VN ID (VN 1) and the next/destination VN Node ID (VN 1 Node 2) into the packet, and submits 430 the packet with inserted VN ID and VN Node ID to SDRA-Op for handling. FIG. 4 further illustrates an end point routing table 432 for VN 1, including an association between end point IDs, destination VN node IDs, and next VN Node IDs. The routing table 432 thus provides both destination-based and tunnel-by-tunnel routing information. Destination-based routing involves the v-router 402 inserting the destination VN node identifier, or corresponding NN ID, into the packet. Tunnel-by-tunnel routing involves the v-router 402 inserting the next VN node identifier, or corresponding next NN ID, into the packet. With tunnel-by-tunnel routing the actual location of the destination end point need not be resolved by the v-router 402. The last VN Node in the path between the source and the destination end point B is operative to resolve the actual anchor point of the destination end point B.

As described above, embodiments include obtaining a location corresponding to the destination end point, for example based on a name or other identifier of the destination end point as specified in the data packet. The correspondence between the destination end point identifier and the location may be stored in an end point routing table, or equivalent data structure. In some embodiments, obtaining the location can be omitted by at least some v-routers, for example if the data packet specifies a valid location corresponding to the destination end point. This may be the case when a v-router previously handling the packet has already obtained and inserted the location into the packet, and the validity of the location has not expired. In some embodiments, the v-router may be operative to check a local end point routing table to obtain the location associated with the name identifier, and if the local end point routing table does not have a corresponding entry, the v-router may be operative to forward the data packet to another v-router that is pre-designated to obtain location information for data packets received by that v-router.

In some aspects, a combination of destination routing and tunnel-by-tunnel routing may be used across a traffic path between a source end point and a destination end point. The source end point is only required to know the VN/service ID and the destination end point name ID in order to exchange information.

In some embodiments, the end point location may correspond to a particular region of the network, such as but not limited to a domain, cluster, edge node service area, or RAN cluster service area. A region of the network may correspond to one or a collection of network nodes, for example in or servicing a common geographic area. The location of the network may indicate a portion of the network which is usable to communicate with the end point.

In some embodiments, the end point location may be an IP address or other network address of the end point. Such an address may be a logical location of the end point, in a network sense.

In some embodiments, when the end point routing table accessible to a v-router does not include a valid entry corresponding to a given end point identifier, the v-router may perform a location resolution operation in which the end point is retrieved from a CM entity or other equivalent entity which tracks end points. In some embodiments, when the end point routing table accessible to a v-router does not include a valid entry corresponding to a given end point identifier, the v-router may forward the packet for handling by another v-router designated for such a task. The other v-router may be, for example, a v-router at a network node located at a higher level in a hierarchically structured VN. For example, a v-router at a cluster or domain level may pass the packet to a v-router at a domain or global level, respectively.

End point routing tables may be updated based on end point mobility. Additionally, or alternatively, end point routing tables may be updated based on changes to network topology, or changes to edge node coverage areas.

Obtaining the location corresponding to the destination end point can be performed in different ways depending on whether the end point is fixed or mobile. For an end point having a fixed location, the location registration procedure can be performed by the network. For a mobile end point, the location registration and subsequent location tracking and updating can be performed by the network in cooperation with the end point.

Figure 5:
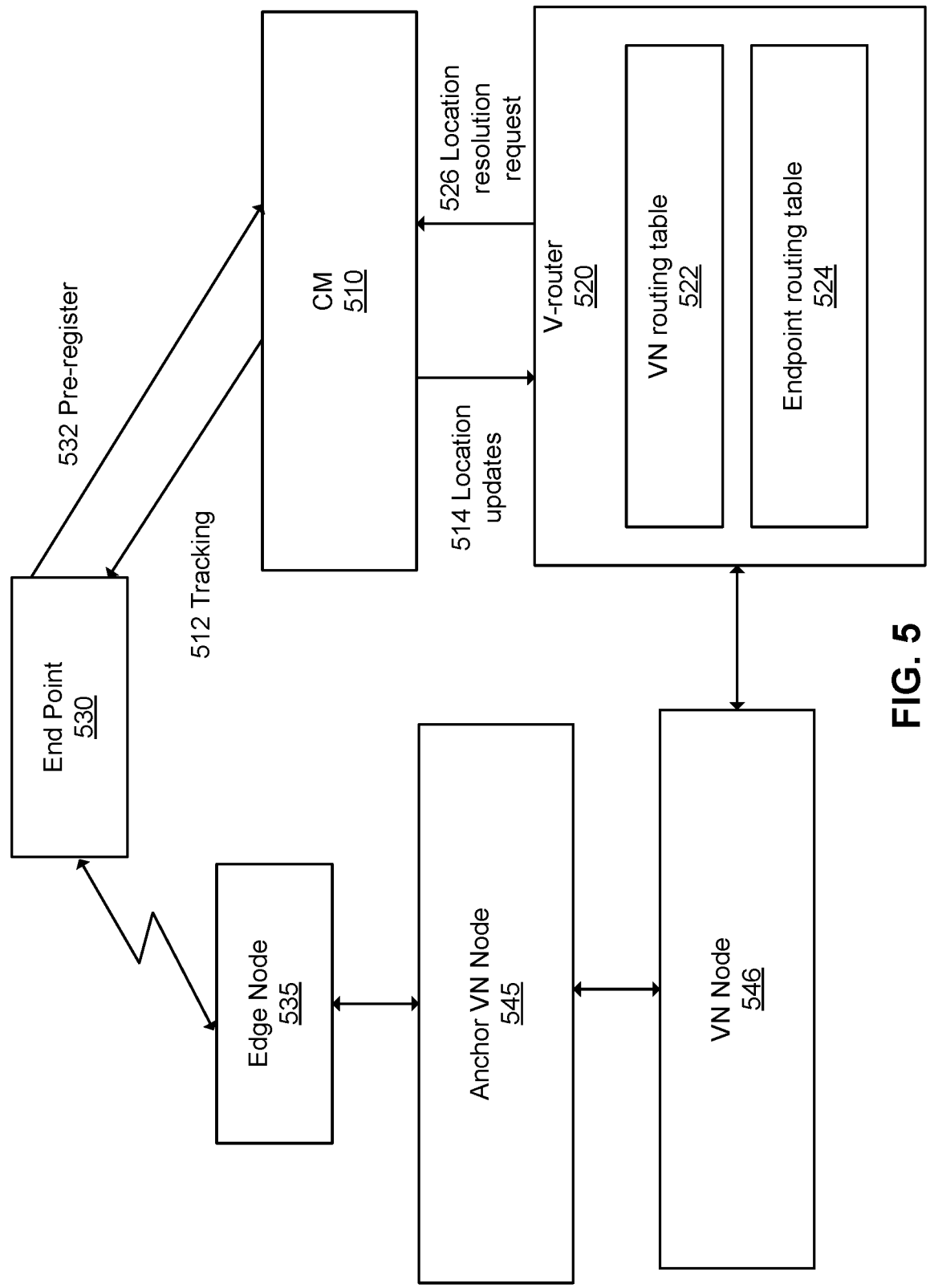
FIG. 5 illustrates interaction of a connectivity manager (CM), a v-router and an end point, according to embodiments.

Embodiments provide for a method and apparatus for forwarding packets toward a specified destination node via a virtual network. The packets may be associated with a service supported by the virtual network. FIG. 5 illustrates interaction of a connectivity manager (CM) 510, a v-router 520 and an end point 530, according to embodiments. The end point 530 may be a UE or a server which communicates with a physical network via an edge node 535. The physical network includes a plurality of interconnected physical nodes, and a subset of the physical nodes are associated with VN nodes, each of the VN nodes including a respective v-router. The end point 530 may be mobile, and thus may communicate with the network via different edge nodes over time.

The end point 530 pre-registers 532 with the CM 510 prior to requesting access to the service. The pre-registration triggers tracking 512 of the end point 530 by the CM 510. Pre-registration and tracking are mediated by the communication network infrastructure. The tracking operation includes tracking location and optionally also activity of the end point 530. As such, the end point location may be tracked prior to its registration with a service or VN and/or user plane network slice supporting the service. The end point location may be represented for example by a RAN cluster which is currently usable to communicate with the end point, or a VN node which is currently usable to communicate with the end point via an edge node and/or RAN cluster. Such a VN node is referred to as an anchor node. The tracking operation may include a reachability operation which interacts with the end point 530 to allow the CM to determine the location of either of the endpoints. As noted above, this may include the CM receiving location information from the end points, or it can include other techniques such as receiving an indication from nodes connected to the end points that the end point has disconnected, or connected. The location information can be provided in context with the topology of the VN, or it may be provided in absolute terms (e.g. a GPS location) that can be mapped to the network topology.

As part of the tracking operation, the CM 510 provides location updates 514 to v-routers, including the v-router 520, indicative of the current location of the end point 530. The location updates may be provided in response to one or more triggers, such as: receipt of a location resolution request 526 by a v-router, a timer or scheduling trigger, or a mobility event of the end point. A combination of triggers may be utilized.

Different trigger conditions may be used for different v-routers. For example, v-routers close to the network edge may receive location updates upon movement of the end point 530 between access nodes or RAN clusters, while v-routers further from the edge network may receive location updates only upon movement of the end point 530 between domains. In some embodiments, the triggers for providing location updates to a given v-router may be configured such that the v-router tends to receive location updates for an end point 530 only when such location updates will change the VN tunnel used by the v-router to route packets toward the end point 530. For example, provision of location updates to the v-router may be inhibited when such location updates will not change the VN tunnel (having ingress at the VN node hosting the v-router) used by the v-router to transmit packets toward the end point.

The CM 510 may include multiple CM components, one or more of which is operatively coupled to a given v-router. The CM components may be organized in a manner which reflects the VN topology. For example, the CM components may be organized in a hierarchical structure. In one embodiment, each VN node may include or be associated with a different CM component. CM components are operatively coupled together and share information such as end point location information.

A hierarchical structure may be used when the VN exhibits a tree-like topology such as is illustrated in FIG. 1A. CM components are associated with each of a plurality of network nodes, including NN 11, NN 13, NN 15, NN 21, NN 23 and NN 25. Such network nodes are associated with VN nodes for example as illustrated in FIG. 1B. A global CM component 146 is provided at the top of the hierarchy, two domain-level CM components 144 are provided below the global CM component 146 in the hierarchy, and four cluster-level CM components 142 are provided below the domain-level CM components 144. The interconnections between CM components, by which location information is propagated, are not shown in FIG. 1A. The CM may be instantiated prior to definition of one or more VNs which are to be supported by same. The CM may support multiple VNs and/or multiple services.

The CM may be provided in a dedicated network slice, referred to as a CM slice, or in a network slice which houses a variety of control and/or management functions. Associations between particular v-routers and particular CM entities and/or CM components of a CM entity may be defined by SDT-Com or SDT-Op. The association may be made by providing one or both of a CM and a v-router with an identifier of a v-router and a CM, respectively.

The v-router 520 operates to route data packets toward the end point 530. The packets are routed toward the end point via VN tunnels, based on the current location of the end point 530 as indicated to the v-router via the location updates 514. The routing path to the end point may include other VN nodes and associated v-routers, as well as an edge node 535 or RAN cluster of multiple edge nodes communicatively coupled to the end point 530.

In some embodiments, the v-router 520 includes at least a VN routing table 522 and an end point routing table 524. Tables refer to data stored in computer memory which associates input data to output data, whether or not in tabular form. In many embodiments, the VN routing table 522 is relatively static, and may be created during VN instantiation for example by SDT-Com. The VN routing table specifies associations between other VN nodes reachable from the v-router 520 and VN tunnels (having ingress at the VN node hosting the v-router) to be used for routing packets toward such VN nodes. The end point routing table 524 is dynamic, such that entries thereof are created and updated according to the location updates 514 provided by the CM 510. The end point routing table specifies associations between end points reachable from the v-router 520 and anchor VN nodes currently usable to reach these end points. After an end point registers to the VN, it can be associated with a VN node which acts as an anchor node of the end point in the VN. As such, when a packet designating the end point 520 as destination is received at the v-router 520, the v-router consults the end point routing table 524 to determine the anchor VN node 545 currently associated with the end point 220. The v-router then consults the VN routing table 522 to determine the VN tunnel to use to reach the anchor VN node 545. The v-router then forwards the packet toward the anchor VN node 545 through its associated VN node 546 via the determined VN tunnel. As will be appreciated, the packet may pass through a plurality of VN nodes 546 on its transmission to its destination anchor VN node 545. Upon receipt of the packet, the anchor VN node may forward the packet on to the end point, for example via an associated edge node or RAN cluster.

In various embodiments, the v-routers associated with VN nodes of the VN are required to identify the next logical tunnel (or next VN node) to which to submit a data packet after receipt and processing by the VN nodes. This identification utilizes an end point routing table at each v-router. For fixed end points, the table can be obtained after end point initial location registration. For mobile end points, a v-router acquires location information from its associated CM entities and updates the end point routing table based on same. Based on the destination name (or ID) and the acquired location information, a v-router will route the data packet to the appropriate next logical tunnel. The VN thus forwards data tunnel by tunnel over the VN until the data packet reaches its destination.

In some embodiments, each v-router may consult its end point routing table to determine an anchor VN node. In other embodiments, once the anchor VN node is determined by one VN node, it may be specified in the packet and re-used by one or more subsequent VN nodes on a limited basis. Re-use may cease (and an end point routing table consulted again) for example after expiry of a timer, after a predetermined number of hops, or upon determining that the end point is no longer reachable via the anchor VN node.

Figure 6A:
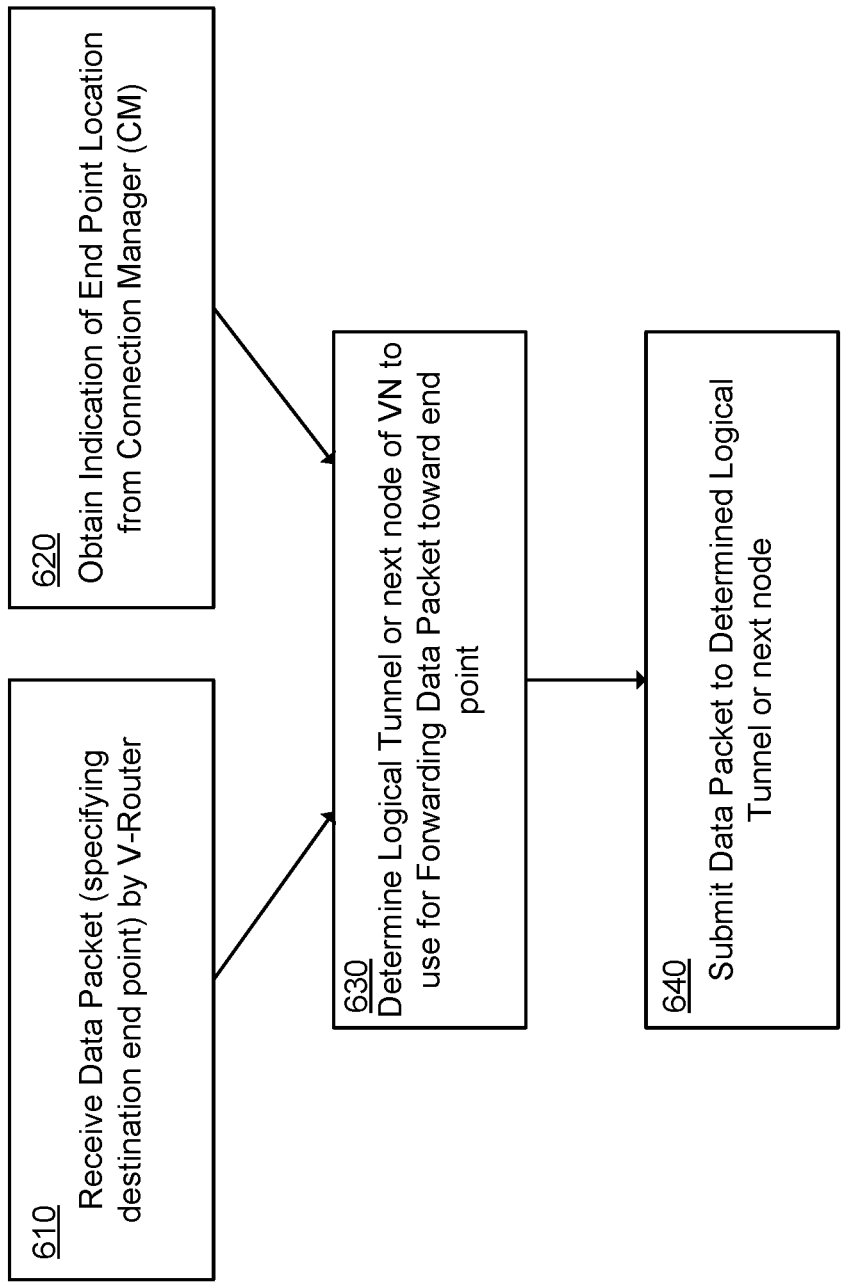
FIGS. 6A and 6B illustrate an example operation of a v-router at a VN node to route data packets to an end point.

In view of the above, embodiments provide for operation of a v-router at a VN node to route data packets to an end point in accordance with a service supported by the VN. Having reference to FIG. 6A, the operation comprises receiving 610 a data packet by the v-router, the data packet associated with the VN and specifying the end point as its destination. The operation further comprises obtaining 620 an indication of location of the end point, the end point location being tracked by a CM and the CM providing the indication of location to the v-router. The operation further comprises determining 630 a logical tunnel of the VN for use in forwarding the data packet toward the end point, based at least in part on the obtained indication of location of the end point. The operation further comprises submitting 640 the data packet to the determined logical tunnel for forwarding toward the end point, i.e. forwarding the data packet via the logical tunnel.

Figure 6B:
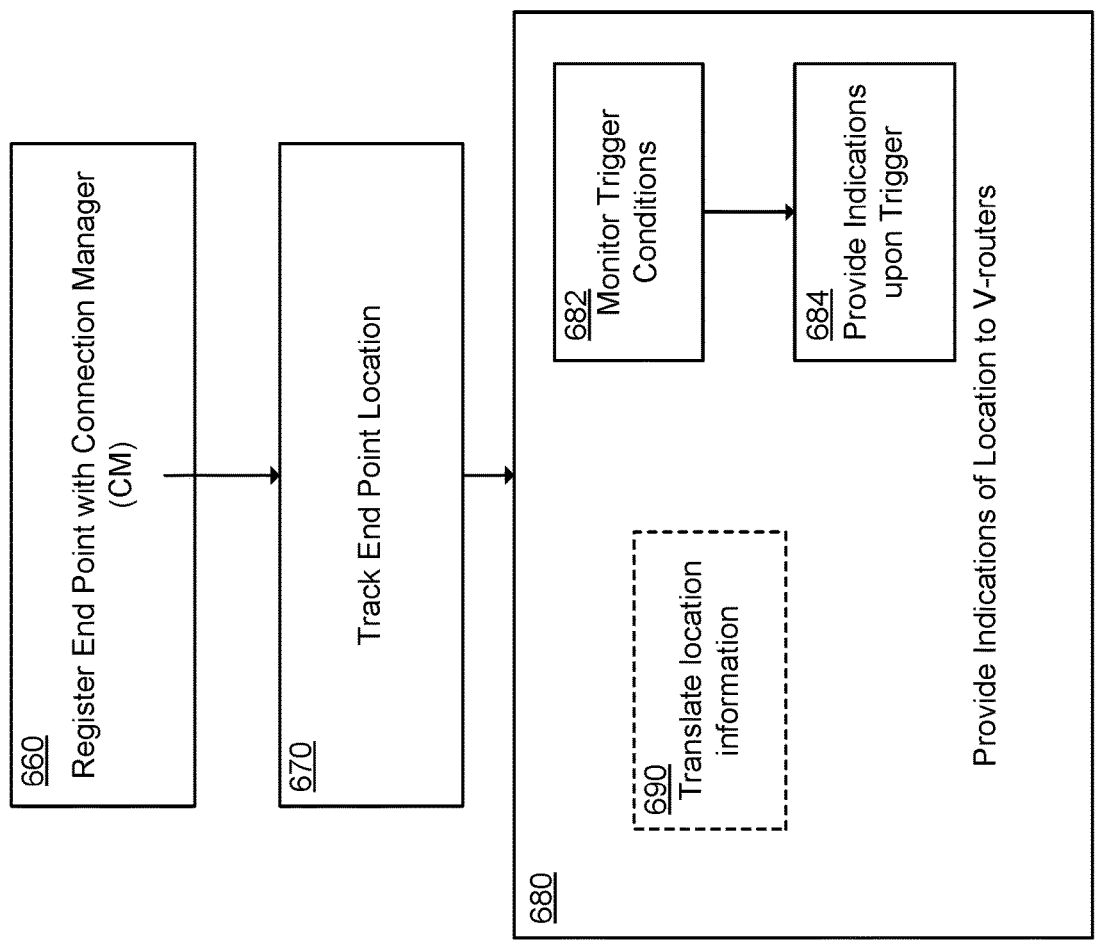

Further in view of the above, embodiments provide for operation of a CM entity to maintain routability of data packets to an end point, in accordance with a service supported by a VN which is in turn supported by the CM. Having reference to FIG. 6B, the operation comprises, following registration 660 of an end point with the CM entity, tracking 670 the location of the end point and providing 680 indications of the location to one or more v-routers of the VN. The v-routers use the indications of location to route data packets to the end point. The CM can monitor 682 one or more trigger conditions, such as timer expires, boundary-crossing events by the end point and/or location resolution requests by the v-routers, and provide 684 the indications in response to satisfaction of the monitored trigger conditions. The CM can translate 690 between reported end point location information, such as a geographic location or edge node or RAN cluster to which the end point associates, and VN-based location information, such as an anchor VN node which is usable to route packets to the end point.

Figure 7A:
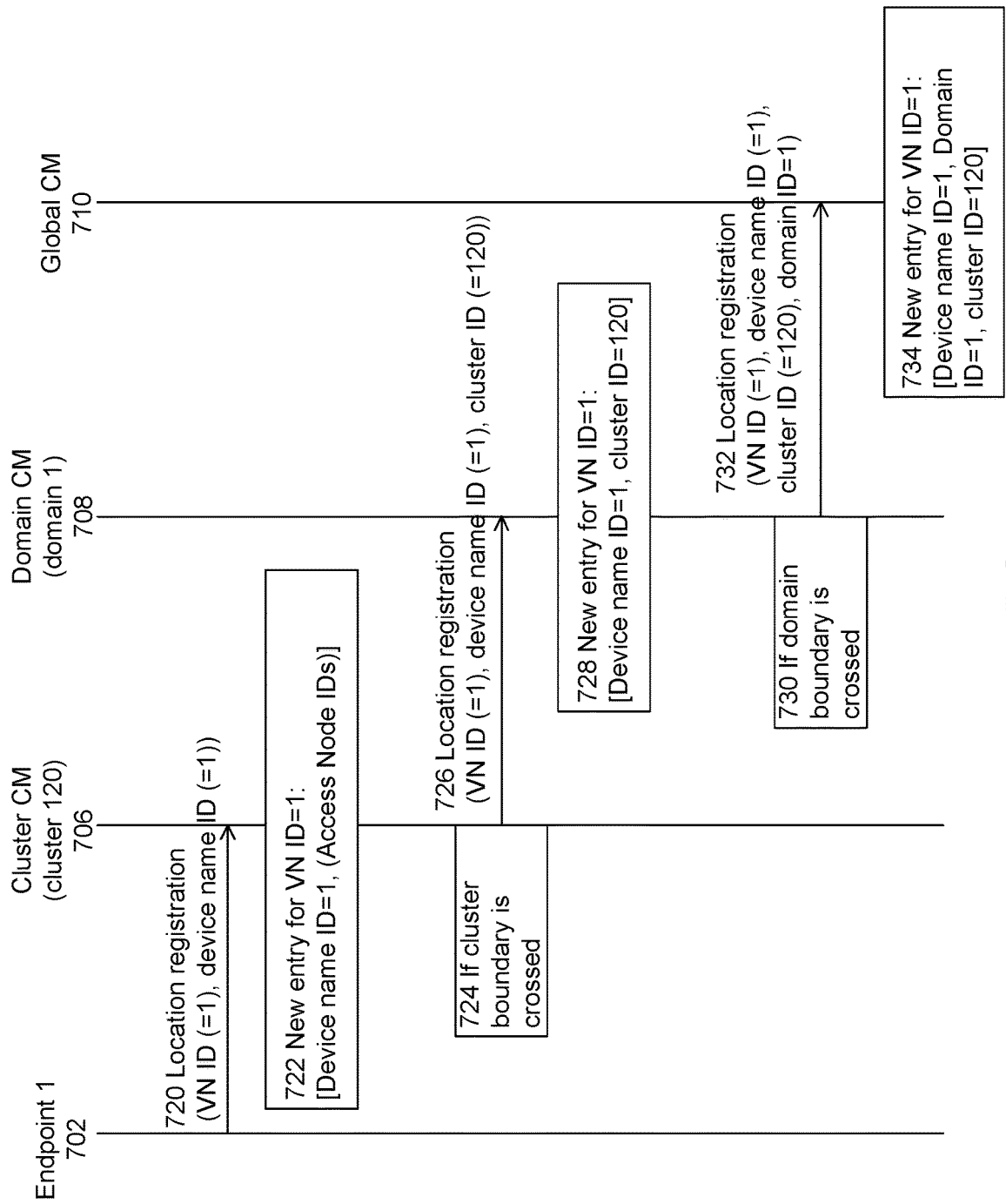
FIGS. 7A and 7B illustrate embodiments of end point location tracking with a CM entity.

FIG. 7A illustrates end point location tracking with a CM entity, according to an embodiment. Device name identifier (or name ID) based location tracking using the hierarchical CM architecture of FIG. 1A is used for purposes of illustration in FIG. 7A. The end point is assumed to communicate with RAN cluster 120.

In more detail, the end point 702 transmits 720 a location registration message to the cluster CM 706 of RAN cluster 120. The location registration message specifies a VN with respect to which the end point is operating and an end point name ID (e.g. the device ID). The cluster CM 706 creates 722 a new entry in its registration table, saving this information along with identities of one or more edge nodes which are communicatively linked to the end point. The cluster CM 706 also determines 724 whether the end point 702 has crossed a cluster boundary. This may be determined for example by checking whether the last registration of the end point was with the cluster CM, for example as evidenced by a recent prior entry in the cluster CM registration table in relation to the end point 702. If the end point 702 is determined 724 to have crossed a cluster boundary, the cluster CM 706 transmits 726 a location registration message to the domain CM 708. This location registration message is similar to the location registration message provided to the cluster CM, but further includes the cluster ID. The domain CM 708 repeats the process. The domain CM 708 creates 728 a new entry in its registration table, saving the location registration message information in association with the device name ID. The domain CM 708 also determines 730 whether the end point 702 has crossed a domain boundary. If the end point 702 is determined 730 to have crossed a domain boundary, the domain CM 708 transmits 732 a location registration message to the global CM 710. This location registration message is similar to the location registration message provided to the domain CM, but further includes the domain ID. The global CM 710 creates 734 a new entry in its registration table, saving the location registration message information. By this operation, the end point 702 registers its current location with the CM. This process is repeated for example periodically or whenever the end point 702 has potentially moved.

In some embodiments, when a cluster or domain boundary is crossed as determined above, the cluster CM 706 or domain CM 708 also transmits location updates to one or more v-routers, in particular those v-routers which will have their routing operations affected by the boundary crossing.

The location registration procedure illustrated in FIG. 7A is an example in which end point explicit location registration is performed. Alternatively, the location registration procedure can be implicit. For example, an end point may only report downlink measurement reports to the cluster CM, or the end point may only send an uplink sequence which is received by edge nodes configured to monitor this sequence report. The edge nodes can determine an uplink signal strength based on the received signal strength (assuming that the end point transmits with a known strength). This measurement of signal strength can be forwarded to the cluster CM. A cluster CM can be configured to maintain the information of candidate set of access nodes (tunnels) for a device which actively receiving data from network.

In some embodiments, in addition or alternatively to the CM components maintaining location registration tables as in FIG. 7A, one or more CM components may maintain end point routing tables. End point routing table entries can then be provided to v-routers in place of location information. In this case, the creation 722, 728, 734 of new entries at CM components can refer to the creation of new routing table entries. A v-router may then directly use the end point routing tables as maintained by its associated CM component, or the v-router may retrieve entries of this routing table in order to main its own local copy of the routing table. The routing table entry maintained by the CM can include: an end point identifier, a destination (anchor) VN node associated with the end point, and, in some embodiments, a next VN node to which to forward packets specifying the end point as destination.

Figure 7B:
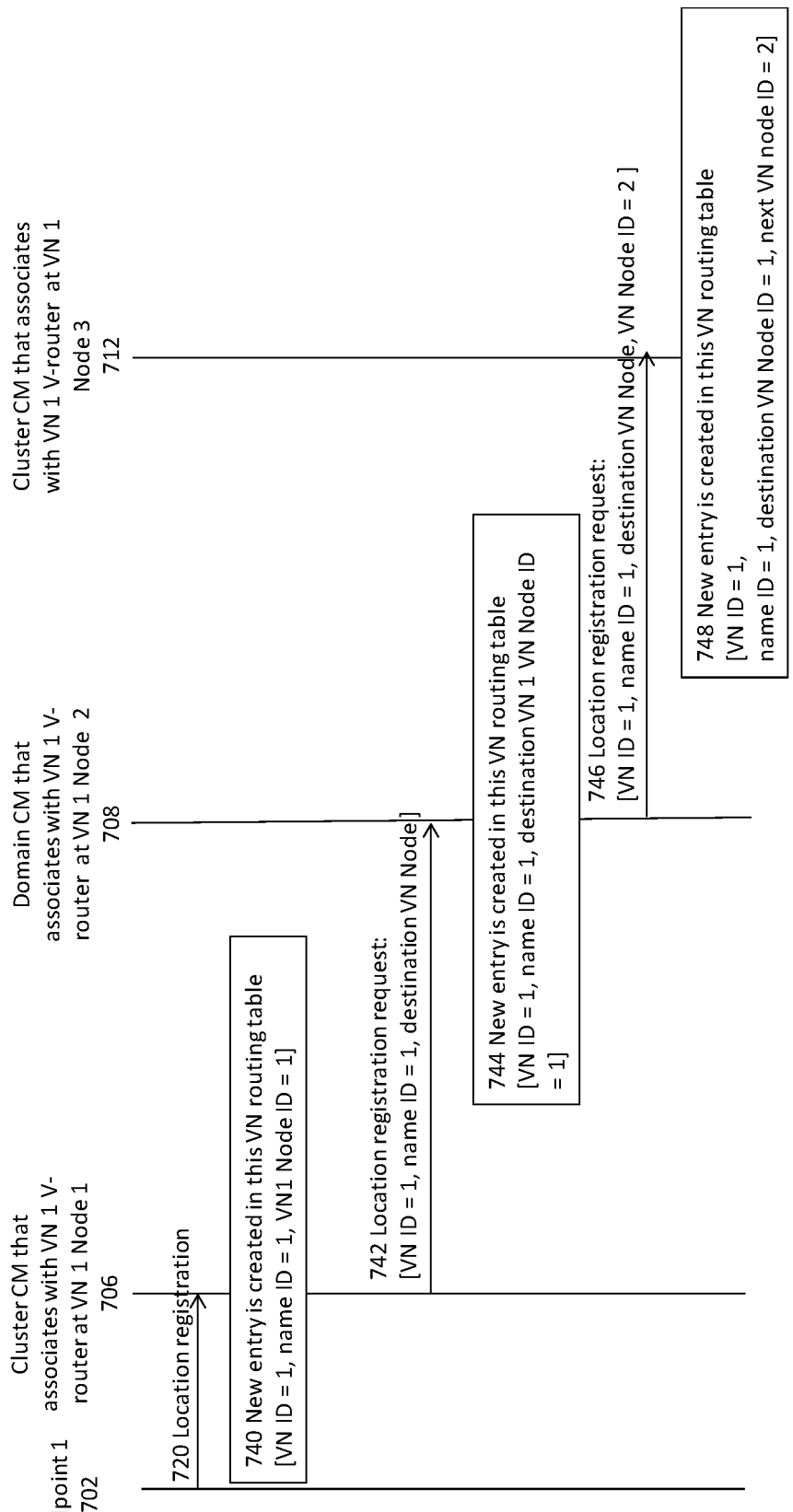

FIG. 7B illustrates an example of the above-mentioned embodiment, namely in which the CM components maintain routing tables. Upon receipt of the location registration message 720, the cluster CM 706 creates 740 a new routing table entry in a routing table managed thereby. In an embodiment, the cluster CM 706 is an instance of the cluster CM 142 which associates with v-router 171 of VN1 at VN1 node 1 151 (as illustrated in FIGS. 1A and 1B). In an embodiment, the new routing table entry includes the VN ID, the end point device name ID, and the identity of the node of VN1 which is used to reach the end point 702. As such, in this embodiment, VN1 node 1 151 may be considered an anchor node for the end point 702.

The cluster CM may then transmit 742 a location registration request message to the domain CM 708, the message including the VN ID, end point name ID, and destination (anchor) VN node ID. The message 742 may be transmitted on an as-needed basis, for example on determining that the end point 702 is newly registered or has crossed a cluster boundary. In an embodiment, upon receipt of the location registration request message 742, the domain CM 708 creates 744 a new routing table entry in a routing table managed thereby. The domain CM 708 is an instance of the domain CM 144 which associates with v-router 172 of VN1 at VN1 node 2 152 (as illustrated in FIGS. 1A and 1B). In an embodiment, the new routing table entry again includes the VN ID, the end point name ID, and the identity of the node of VN1 which is used to reach the end point 702.

The domain CM may then transmit 746 a location registration request message to another cluster CM 712, the message including the VN ID, end point ID, and destination (anchor) VN node ID. The message 746 may be transmitted on an as-needed basis. Upon receipt of the location registration request message 742, in an embodiment the cluster CM 712 creates 748 a new routing table entry in a routing table managed thereby. In an embodiment, the cluster CM 412 may be an instance of the cluster CM 142 which associates with v-router 173 of VN1 at VN1 node 3 153 (as illustrated in FIGS. 1A and 1B). In an embodiment, the new routing table entry again includes the VN ID, the end point ID, and the identity of the node of VN1 which is used to reach the end point 702. The new routing table entry also includes a next VN node ID, indicative of a next VN node to forward packets to when such packets specify end point 702 as destination. A similar location registration message may be transmitted to the global CM.

Figure 7C:
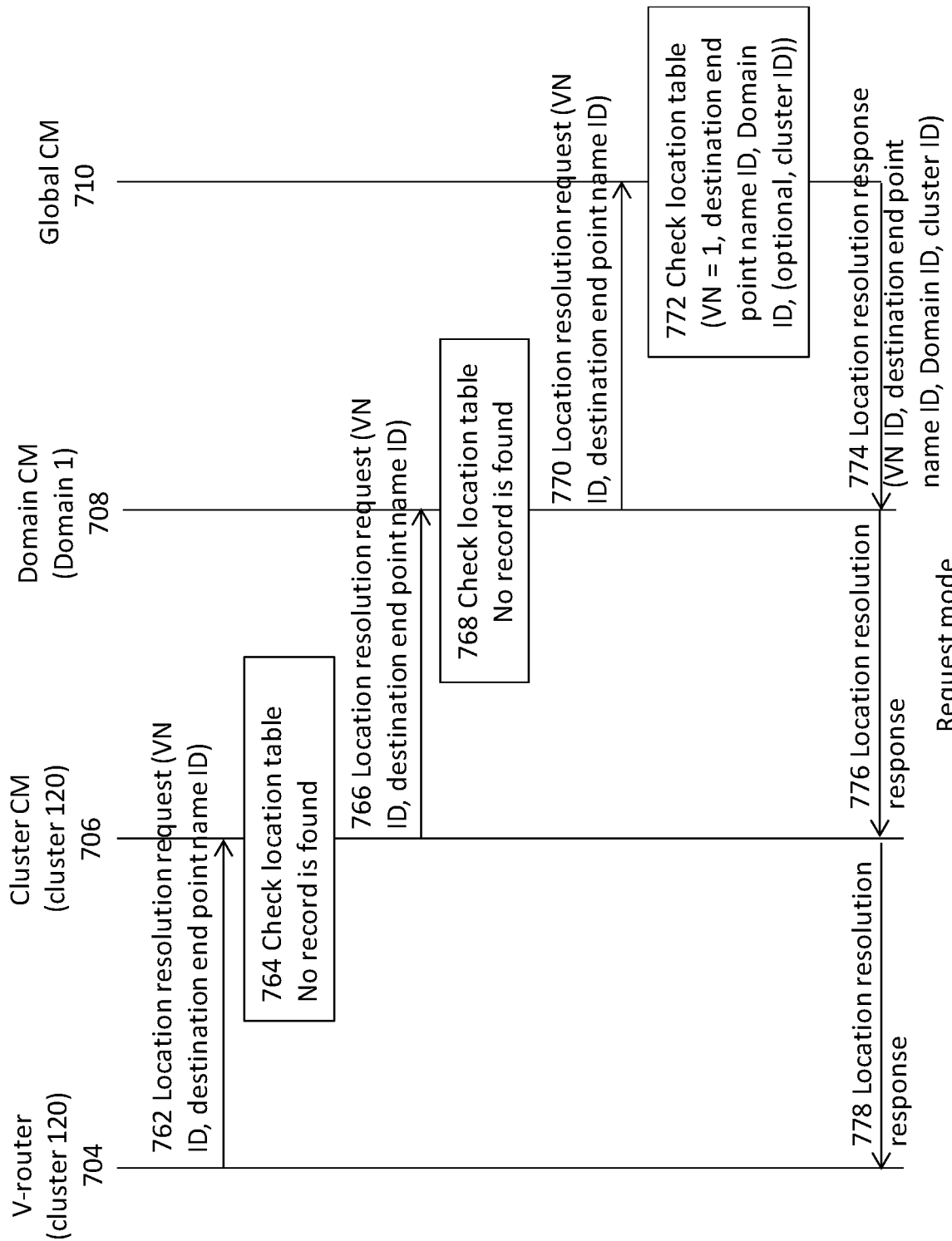
FIG. 7C illustrates interaction between a v-router and a CM, including location updating in a request mode, according to an embodiment.

FIG. 7C illustrates interaction between a v-router and a CM, including satisfaction of a location resolution request, according to an embodiment. This operation corresponds to a request mode, in which a v-router contacts its associated CM to obtain location information, for example upon determining a need for this location information. The v-router 704 (in the present example belonging to cluster 120), transmits 762 a location resolution request specifying an end point to the cluster CM 706 of cluster 120. The cluster CM 706 checks 764 its location registration table. If an entry is found for the end point, a location resolution response is returned to the v-router 704. Otherwise, as illustrated, the cluster CM 706 transmits 766 the location resolution request to the next-higher-level CM component in the hierarchy, namely the domain CM 708. (In the example of FIG. 7C, it is assumed that only the global CM registration table has an entry for the end point.)

The domain CM 708 checks 768 its location registration table. If an entry is found for the end point, a location resolution response is returned to the cluster CM 706 and subsequently to the v-router 704. Otherwise, as illustrated, the domain CM 708 transmits 770 the location resolution request to the next-higher-level CM component in the hierarchy, namely the global CM 710. The global CM 710 checks 772 its location registration table and locates the corresponding location entry for that end point device name ID. A location resolution response is then returned 774 to the domain CM 408 which in turn returns a location resolution response 776 to the cluster CM 706, which in turn returns a location resolution response 776 to the v-router 704 including a location identifier and the name ID.

In various embodiments, when the cluster CM 706 or the domain CM 708 receives a location resolution response 774, 776, it may store the included location information in its location registration table. Such operation tends to cache location information toward lower levels of the CM hierarchy in response to higher location request frequency.

Figure 7D:
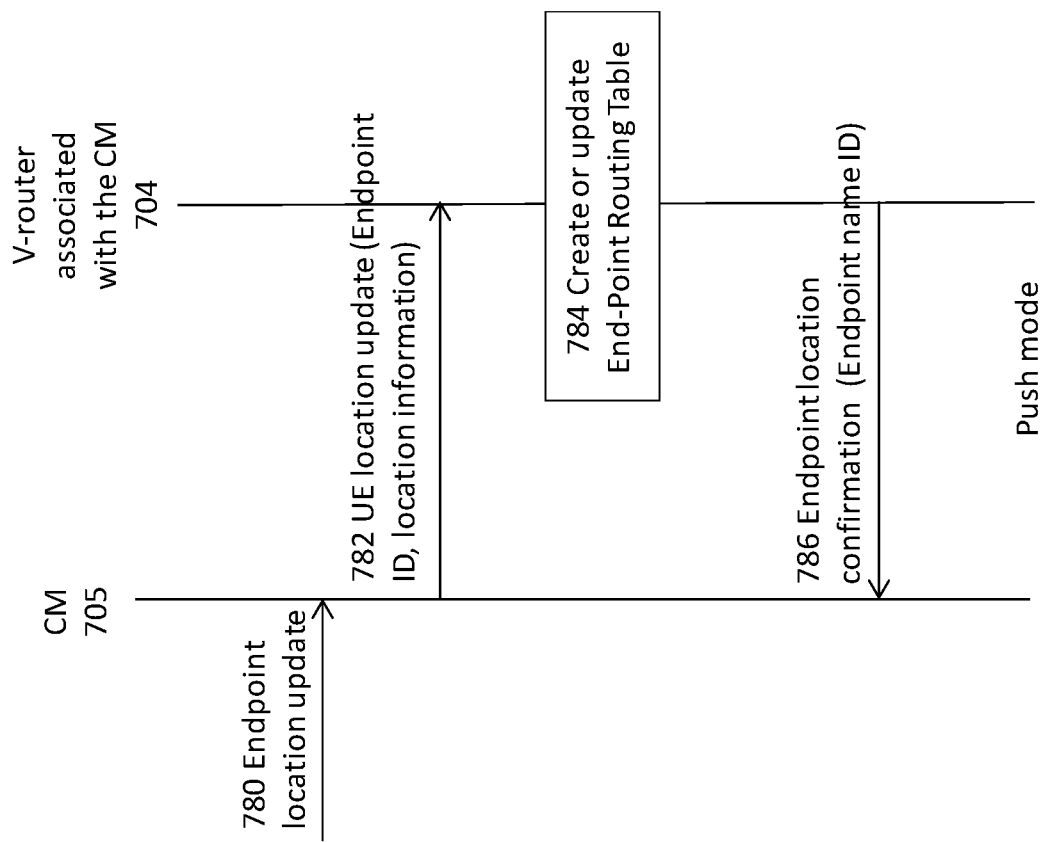
FIG. 7D illustrates interaction between a v-router and a CM, including location updating in a push mode, according to an embodiment.

FIG. 7D illustrates interaction between a v-router and a CM, including location updating in a push mode (rather than the request mode of FIG. 7C), according to an embodiment. The CM provides the v-router with updated location information without requiring a request from the v-router. The updates can be triggered for example by the end point moving into a new domain. The CM 705, which may for example be a cluster CM, domain CM, or global CM, receives 780 an end point location update, for example from an end point or function monitoring an end point. The CM 705 then transmits 782 an end point location update, including the end point name ID and location information, to a v-router 704 associated with the CM 705. The v-router 704 creates or updates 784 a corresponding entry in its end-point routing table to record the current location of that end point. The v-router may also transmit 786 a location confirmation to the CM 705, indicating that the location update is successful. In some aspects, the v-router may forward the end point location update to other v-routers, such as v-routers located lower in the network hierarchy.

It is noted that various combinations of push mode and request mode updating may be employed, for example in order to trade-off signaling overhead and location accuracy.

As described above, embodiments include obtaining an indication of a destination VN node which corresponds to the obtained end point location. The correspondence between the destination VN node and the end point location may be stored in a VN topology description table, or equivalent data structure.

The VN topology description table includes a plurality of correspondences between destination VN nodes and end point locations. In some cases, a table entry for a given destination VN node may correspond to a range of end point locations, such as a range of IP addresses. VN nodes further away from the destination VN node may simply direct traffic towards the destination VN node that is responsible for that range of IP addresses. In this way, the number of location updates can be reduced across the network as the general location of the destination end point is defined, and an identity of a VN node responsible for performing the final location resolution is provided. The VN topology description table may be defined at time of instantiating the VN, and may be updated when changes to the VN topology occur.

The destination VN node corresponds to a VN node which is usable to forward packets to the end point location, and which is proximate to the end point location. A destination VN node may be an anchor VN node for the end point, or a VN node serving a RAN cluster in communication with the end point, or a VN node co-located with an edge node which is in communication with the end point.

An anchor VN node may be used as a destination VN node. An anchor VN node of an end point is a VN node which is proximate, in terms of the network topology, to the end point, and which is capable of delivering a packet toward the end point.

As described above, embodiments include obtaining an indication of a next node on a pre-configured path between the v-router and the destination VN node. The path is defined by one or a plurality of logical tunnels of the VN, for example connected in series via one or more intermediate VN nodes. The next node corresponds to the intermediate VN node of the path (or destination VN node if the path corresponds to a single hop) which is most adjacent to the current VN node (i.e. the VN node associated with the v-router). The next node is directly communicatively coupled, via a logical tunnel, to the current VN node. Because a VN node may be associated with multiple outgoing logical tunnels, multiple potential next nodes are possible, and routing comprises selecting the appropriate next node.

In various embodiments, selecting a next node may be replaced with the equivalent operation of selecting a logical tunnel which links the current VN node to the next node.

Embodiments employ destination-based VN routing, in which each v-router includes a VN routing table and/or tunnel configuration table, or other functionally equivalent data structure, which associates a set of destination VN nodes with a respective set of next nodes. V-routers are thus pre-configured to store associations between destination VN nodes and next nodes, and, upon receipt of a data packet specifying a destination VN node for which such an association is stored, to forward the data packet toward the associated next node. The associations may be provided for example at VN instantiation and possibly updated in response to VN topology changes.

In some embodiments, a plurality of VN paths to a destination VN node may be possible, and a v-router may be configured to select one of these paths by selecting one of a plurality of next nodes, each associated with one of the VN paths. Path selection may be based for example on network load balancing considerations.

Embodiments comprise preparing and forwarding the data packet. Preparing the data packet includes operating the v-router to insert the obtained indication of the next VN node (e.g. the next VN node identifier) into the data packet to produce a routed data packet. Forwarding the data packet includes operating the v-router to submit the routed data packet to the physical network node which is associated with the VN node and v-router. The physical network node transmits the data packet across the network to a next physical network node associated with the next VN node.

In various embodiments, SDRA-Op provides an interface between the VN node (and/or v-router) and the associated physical network node. SDRA-Op is configured to receive a routed packet from the v-router and, based on information such as the VN ID and indication of the next node (or tunnel ID), to process the packet header. Processing the packet header may be based on a physical resource mapping format and a resource assigned for handling the packet and/or supporting the VN node. SDRA-Op subsequently submits the packet to the physical network node associated with the VN node. The physical network node then forwards the packet to another physical network node, and so on, along a path to the physical network node associated with the next VN node. This physical network node corresponds to an egress of the logical tunnel being used.

In some embodiments, when a logical tunnel of a VN can be mapped to multiple physical paths, SDRA-Op is configured to determine a rate splitting parameter for controlling proportions of data flow over these physical paths. This may be implemented using source routing, for example. SDRA-Op may then determine, for each received packet, which of the multiple physical paths to use to transmit the packet, in accordance with the rate splitting parameter.

Processing of the packet header by SDRA-Op may be performed in different ways depending on the physical resource mapping format. For IP-like routing, packet header processing may comprise changing the VN Node ID to the IP address of the NN to which the VN Node associates, and inserting a QoS field. For source routing, packet header processing may comprise changing the VN Node ID to a source routing header, and inserting a QoS field. For label based routing or dedicated resource routing formats, packet header processing may comprise removing the VN Node ID but retaining the VN ID.

In some embodiments, the v-router is associated with a RAN cluster used for transmitting data packets to a mobile device. In this case, the v-router is configured to determine the access nodes (tunnels) to which the data packet can be forwarded. For multiple destination access nodes (tunnels) and multipath implementations, SDRA-Op may be configured to determine the rate splitting parameters over these logical VN tunnels. The determination may be made based at least in part on the multiplexing or sharing of physical resources between multiple VNs.

Figures 8A, 8B:
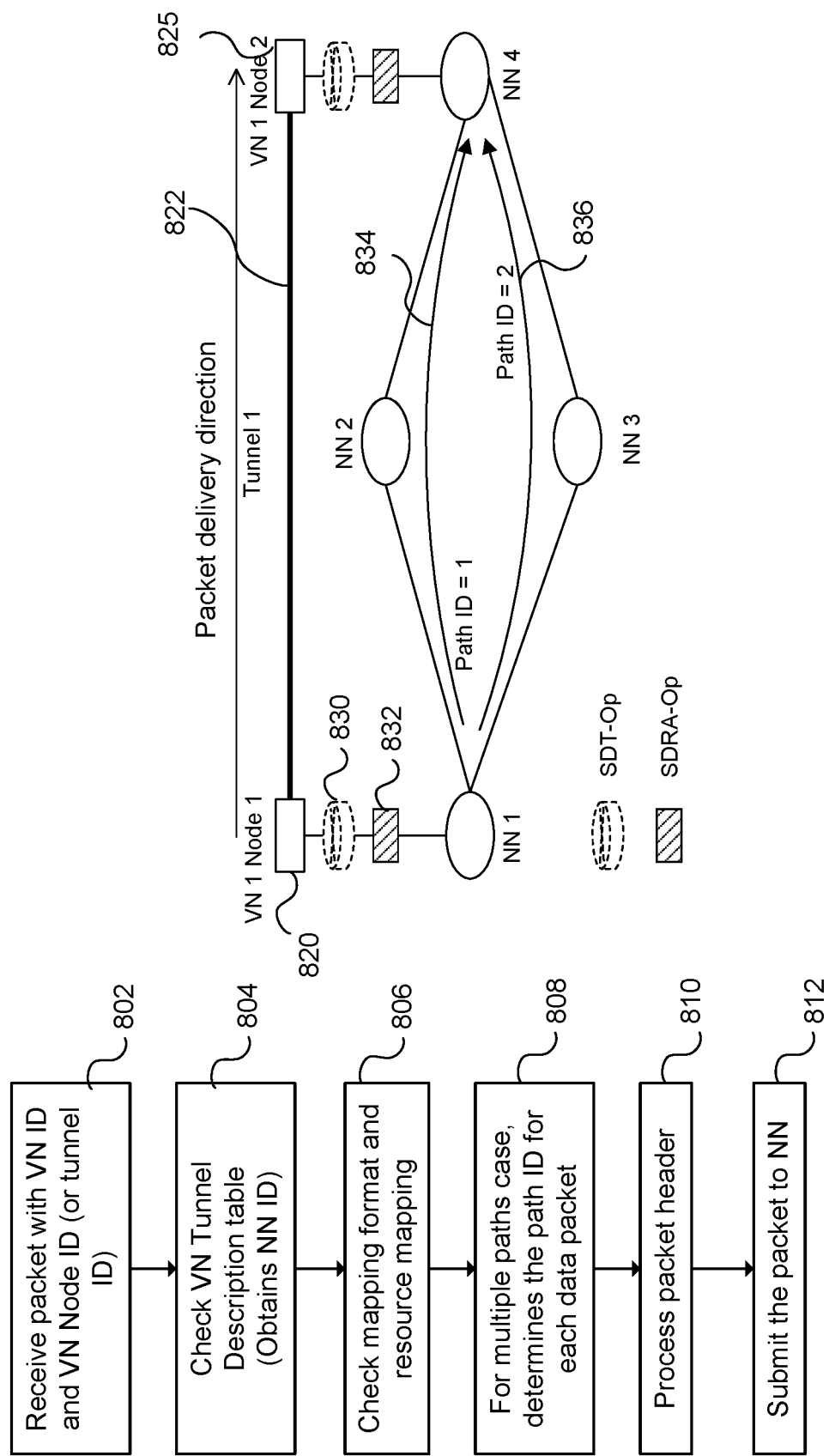
FIGS. 8A and 8B illustrate an embodiment of general packet processing operations of SDRA-Op executed on a VN Node in coordination with the associated v-router.

FIGS. 8A and 8B illustrate general packet processing operations of SDRA-Op executed on a VN Node in coordination with the associated v-router. Having reference to FIG. 8A, in an embodiment the SDRA-Op receives 802, from a process operating on the v-router associated with that VN node, a packet with a given VN ID and next VN node ID (or equivalent tunnel ID). SDRA-Op then checks 804 a VN tunnel description table accessible thereto to obtain an identity of a physical network node (NN) associated with the next VN node ID. SDRA-Op then uses 806 a physical resource mapping format and the corresponding physical resource mapping, which may in some embodiments be a table, to obtain the physical mapping from the current NN of the SDRA-Op (e.g. NN 1), to the destination NN (e.g. NN 4). If there are multiple potential physical paths, such as path 1 834 and path 2 836 illustrated in the example of FIG. 8B, SDRA-Op then determines 808 a path ID to use for each data packet. SDRA-Op then processes 810 the packet header to configure it to traverse the identified path, and submits 812 the packet to the associated network node. It is noted that in some embodiments, functions of the SDRA-Op and the v-router may be distributed such that some or all of the functions of the v-router may be performed by SDRA-OP, and vice versa.

FIG. 8B illustrates a portion of the network between a first VN node 820 and a second VN node 825, connected via a logical tunnel 822. The first VN node 820 is associated with a first network node NN1, and an instance of SDT-Op 830 and SDRA-Op 832. The v-router at the first VN node may comprise one or a combination of SDT-Op 830 and SDRA-Op 832. Path ID=1 corresponds to a first network path 834 supporting the logical tunnel 822 and Path ID=2 corresponds to a second network path 836 supporting the logical tunnel 822.

Figure 8E:
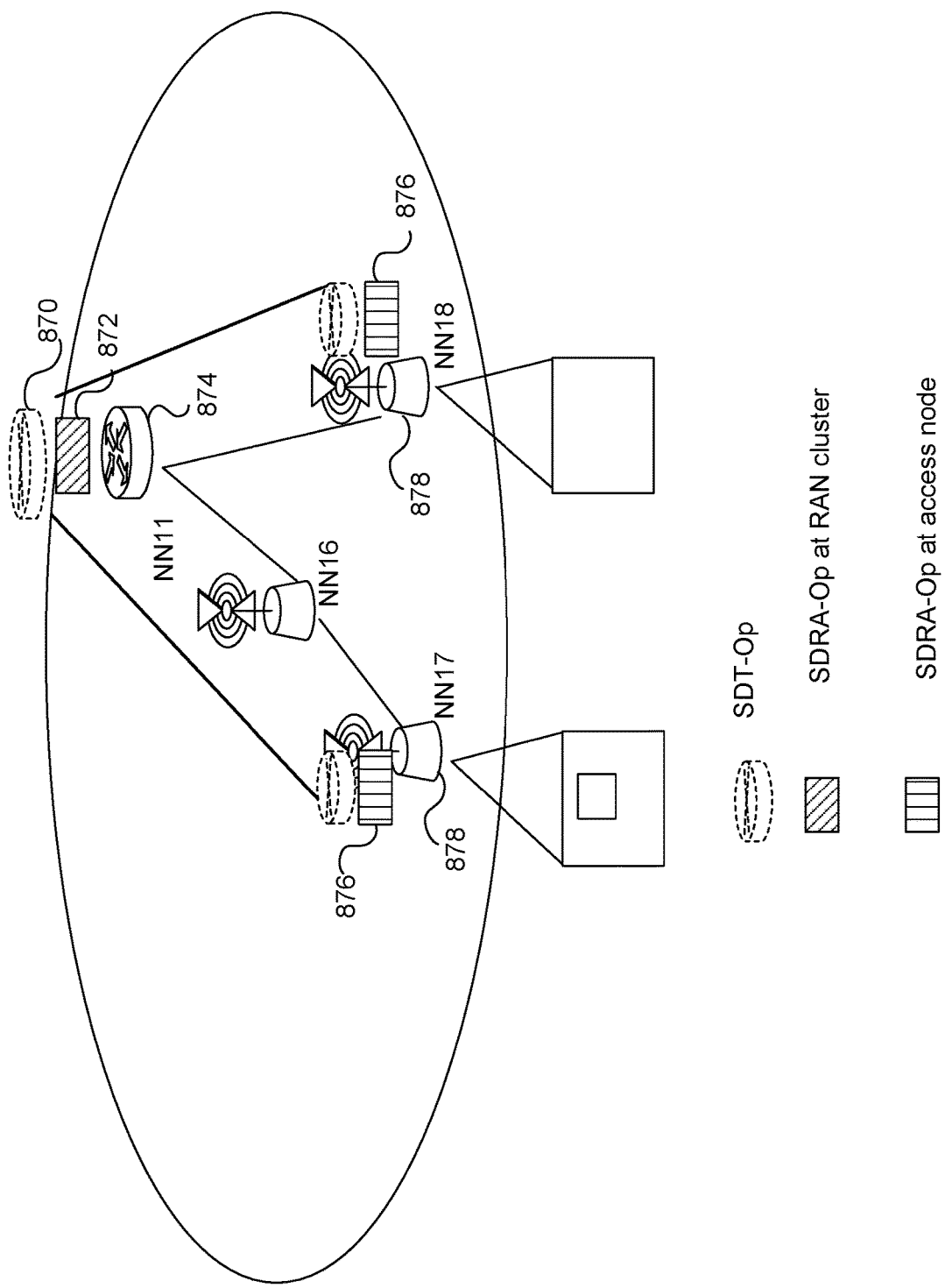
FIG. 8E is a network architecture diagram showing an embodiment of DDT-Op, SDRA-Op, and SDRA-Op placement in an embodiment.

FIGS. 8C and 8D illustrate packet processing operations of SDRA-Op at a RAN cluster and an access node, respectively. The topology is illustrated in FIG. 8E. With reference to FIG. 8C, SDRA-Op 872 receives 842, from a process operating on the v-router (or SDT-Op), a packet with a given VN ID and next VN node ID (or equivalent tunnel ID), or alternatively with a given set of access node IDs corresponding to access nodes of the RAN cluster (or equivalent open tunnel IDs). SDRA-Op can then determine 844 an identity of a network node associated with the next VN node ID. In some embodiments, this determination can be performed using a VN tunnel description table. SDRA-Op can then determine 846 a physical resource mapping in accordance with the identity of the network node. This can be done, in some embodiments, by checking a physical resource mapping format and a corresponding physical resource mapping table. If there are multiple potential physical paths, SDRA-Op then determines 848 destination access nodes to use for transmitting each data packet. SDRA-Op then processes 850 the packet header to configure it to traverse the identified path(s), and submits 852 the packet to the associated network node.

With reference now to FIG. 8D, SDRA-Op 876 at the access node receives 860 a packet to be delivered to an end point device A of a given VN. SDRA-Op then checks 862 the VN mapping format and pre-assignment of access link resources (if used) for communicating with the end point device A. If pre-assigned access link resources are not used, SDRA-Op assigns 864 access link resources for use in communicating with end point device A and transmits the packet to device A using the assigned access link resources. If pre-assigned access link resources are used but shared access link resources are not used, SDRA-Op assigns 866 access link resources from within the set of pre-assigned resources for use in communicating with end point device A and transmits the packet to device end point A using the assigned access link resources. Otherwise, if pre-assigned and shared access link resources are used (e.g. a broadcast channel is assigned), SDRA-Op transmits 868 the packet to device A using the pre-assigned, access link resources.

FIG. 8E illustrates a network architecture showing the placement of SDT-Op 870 and SDRA-Op 872 at the RAN cluster node 874, and SDRA-Op 876 at access nodes 878.

Figure 9:
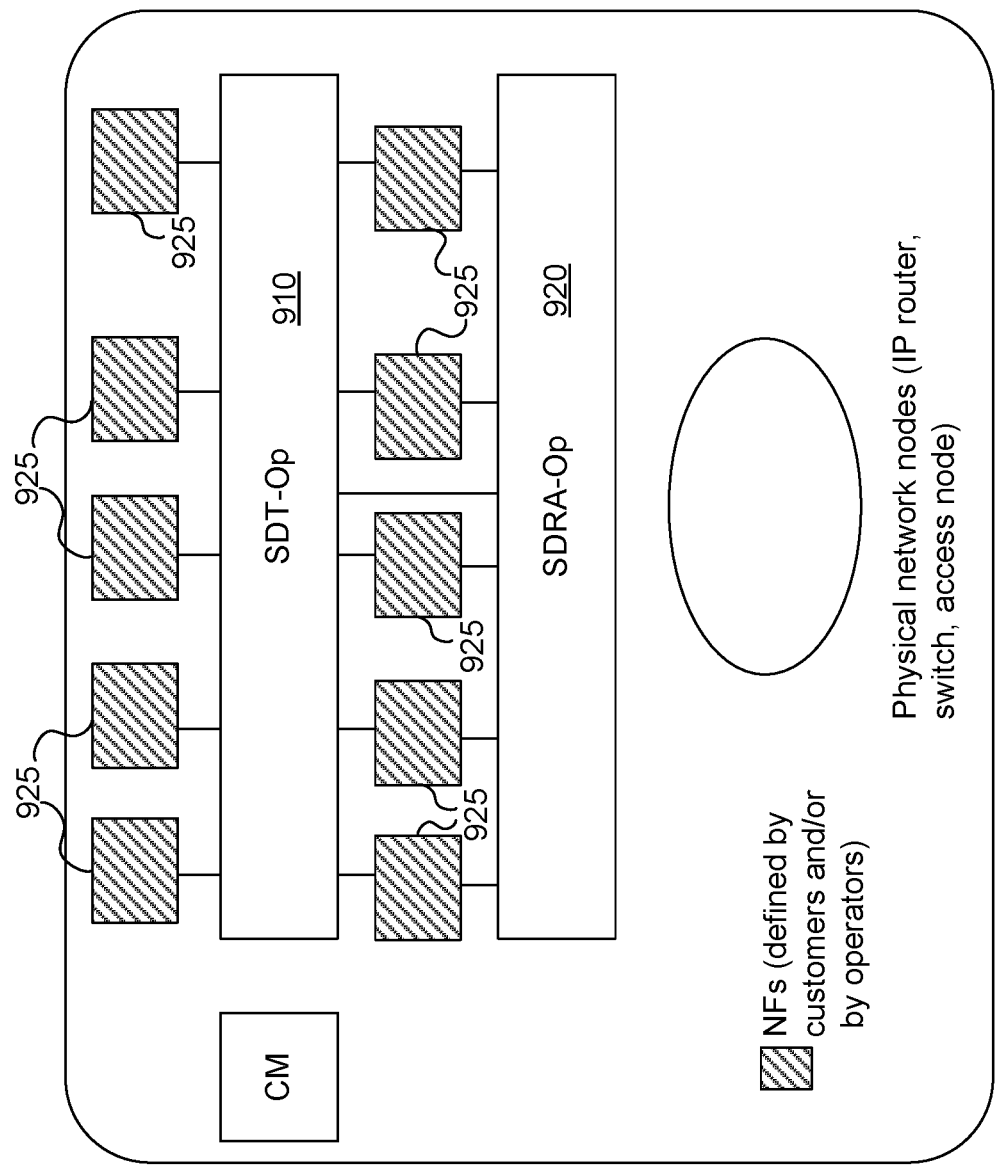
FIG. 9 illustrates the interaction between SDT-Op and SDRA-Op, according to an embodiment.

FIG. 9 illustrates the interaction between SDT-Op 910 and SDRA-Op 920, according to an embodiment. In this embodiment, it is assumed that SDT-Op 910 and SDRA-Op 920 provide service to multiple VNs. In most cases, SDT-Op 910 receives packets from a network function 925 (such as an application function), processes the received packets to determine the next tunnel, and sends the packet directly to SDRA-Op 920. In some other cases, SDT-Op 910 sends the processed packet to another NF 925 (e.g. a packet aggregator) and the other NF sends the packet on to the SDRA-Op 4920, either directly or via SDRA-Op 920. SDRA-Op 4920 passes packets to and from the physical network node 930. The operation of the SDRA-Op 920 can be configured by SONAC-Com during the VN configuration phase. SDT-Op 910 and SDRA-Op 920 can also be implemented on a per-VN basis to provide differentiated interaction for different VNs.

In some embodiments, at RAN clusters, a VN with multiple tunnels or multiple open tunnels is defined and realized to enable handover-free to mobile device or to support customer services with high reliability requirement.

In some embodiments, at a RAN cluster and to deliver a data packet to a mobile end point, a v-router in the RAN cluster is configured to obtain, from the CM, location information indicative of one or more candidate edge nodes for reaching the mobile end point. The v-router then determines the destination edge nodes (or tunnels connecting thereto) and sends the packet with one or multiple destination node IDs (as well as a VN ID) to SDRA-Op for conveyance to associated destination edge nodes. This operation may facilitate a multipath transmission, in which different data packets are routed to different edge nodes for transmission, or a multicast transmission, in which a single data packet is routed to different edge nodes for concurrent transmission thereby.

In some embodiments, VN routing tables can be updated in response to packets that are handled by a v-router. In particular, when a v-router handles a packet travelling in a first direction, i.e. from a particular end point, then the v-router can determine the originating VN node and previous VN node traversed by the packet, for example by obtaining such information from the packet. The v-router can then check its VN routing table, and update the VN routing table and/or tunnel configuration table as required based on this information. Similarly, the v-router can obtain, from the packet, information related to the source end point that generated the packet and the originating VN node, and update the VN topology description table and/or end point routing table based on this information. The routing tables can be updated so that packets following a return path can be routed back to an originating end point and/or VN node, without requiring an additional location resolution request.

Figure 10:
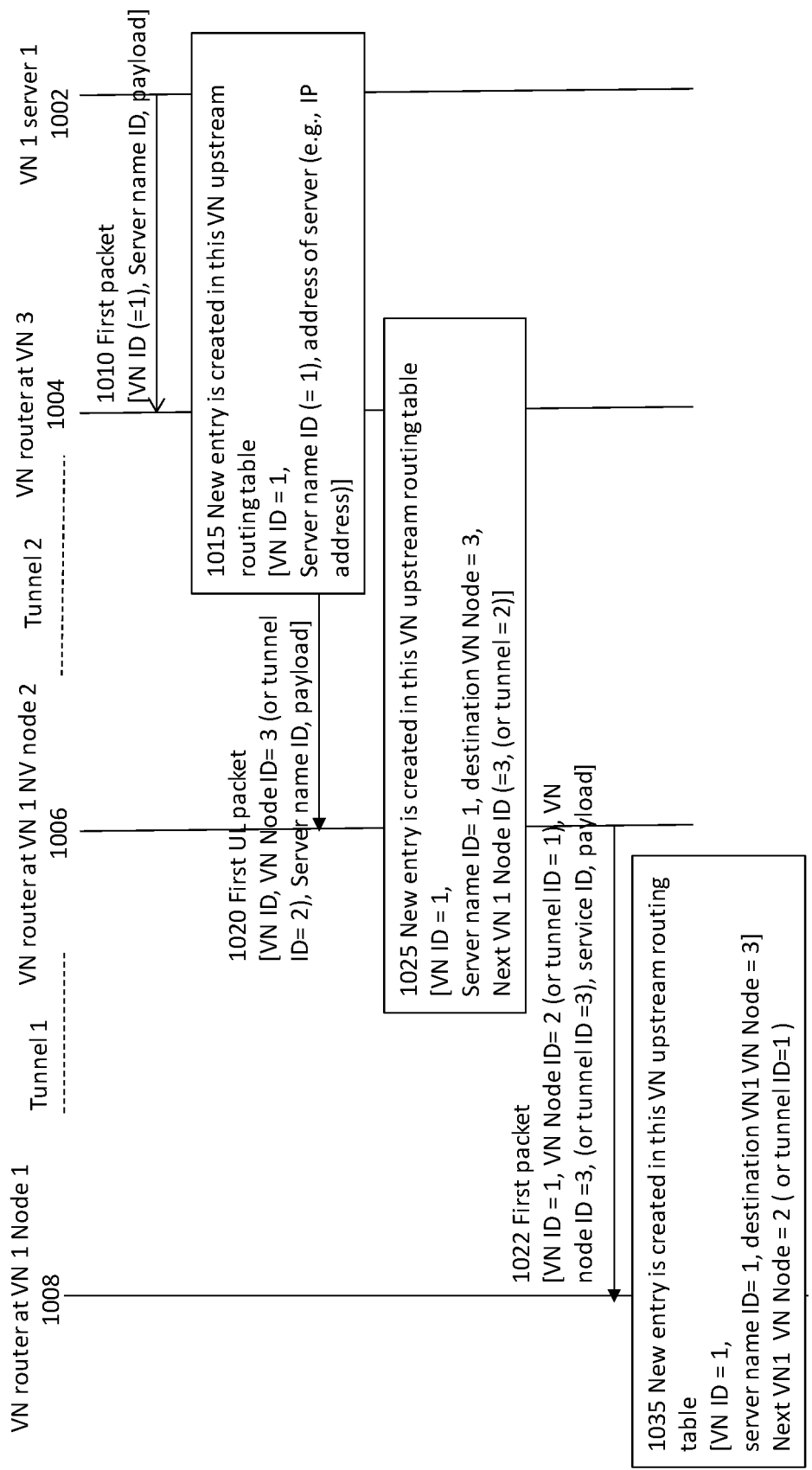
FIG. 10 illustrates v-router operation in response to a first packet transmitted by a server end point, according to an embodiment.

FIG. 10 illustrates v-router operation in response to a first packet 1010 transmitted by an end point that comprises a server 1002, according to an embodiment. A VN router 1004 receives the packet 1010 and creates 1015 a new entry in its upstream routing table, associating the server name ID with the network address of the server 1002. The packet is then forwarded 1020 to another VN router 1006, which, upon receipt, creates 1025 a new entry in its upstream routing table, associating the server name ID with the destination VN node 1004 and the next VN node (also 1004) (or equivalent tunnel ID). The packet is then forwarded 1022 to another VN router 1008, which, upon receipt, creates 1035 a new entry in its upstream routing table, associating the server name ID with the destination VN node 1004 and the next VN node also 1006 (or equivalent tunnel ID).

Figure 11:
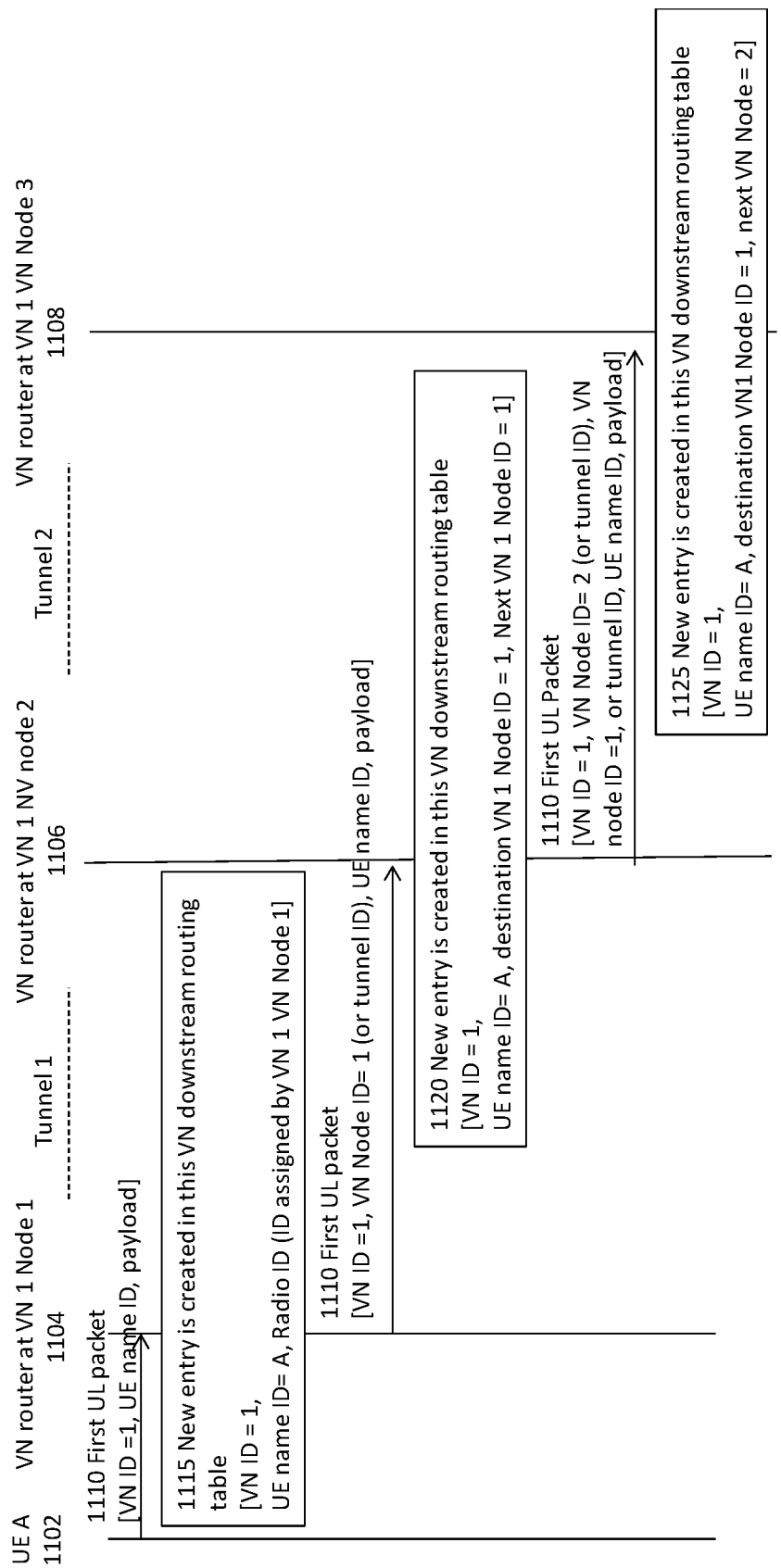
FIG. 11 illustrates v-router operation in response to a first packet transmitted by a UE end point, according to an embodiment.

FIG. 11 illustrates v-router operation in response to a first packet 1110 transmitted by an end point that comprises a UE 1102, according to an embodiment. A VN router 1104 receives the packet 1110 and creates 1115 a new entry in its downstream routing table, associating the UE name ID with the radio ID of UE 1102. The packet is then forwarded to another VN router 1106, which, upon receipt, creates 1120 a new entry in its downstream routing table, associating the UE name ID with the destination VN node 1104 and the next VN node (also 1104) (or equivalent tunnel ID). The packet is then forwarded to another VN router 1108, which, upon receipt, creates 1125 a new entry in its downstream routing table, associating the UE name ID with the destination VN node 1104 and the next VN node also 1106 (or equivalent tunnel ID).

Figure 12:
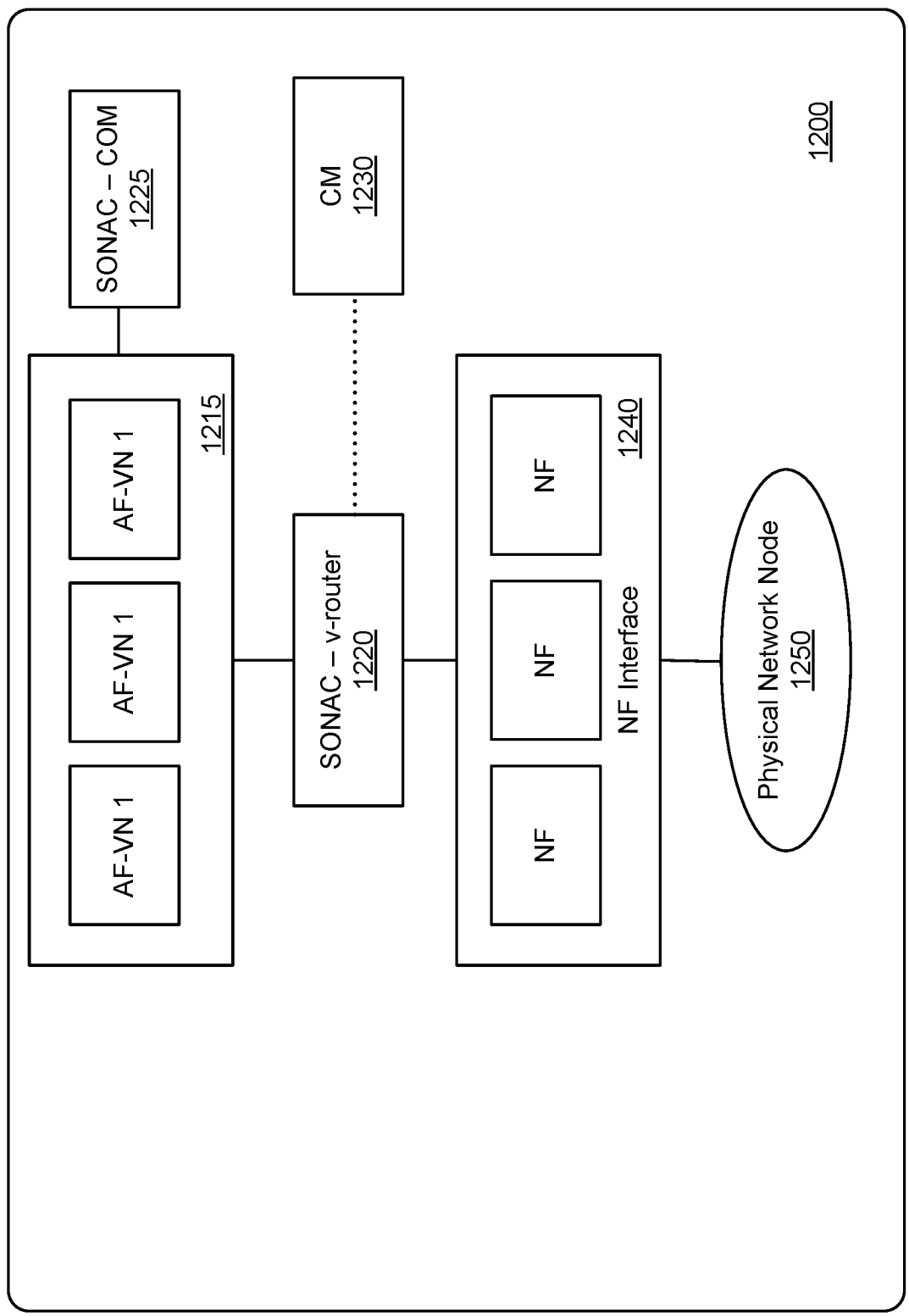
FIG. 12 illustrates an embodiment of an apparatus associated with a VN node.

FIG. 12 illustrates an apparatus 1200 associated with a VN node, according to an embodiment, which may also be regarded as a functionality of SONAC, along with interfaces thereof. The apparatus includes a v-router 1220, which may be regarded as or managed by a SONAC-Op component. The v-router 1220 may be configured by SONAC-Com 1225, which is illustrated as a separate component for clarity. The v-router 1220 may also communicate with a connection management (CM) entity 1230, in order to receive obtain current location information of end points for use in updating routing tables of the v-router. The v-router and/or SONAC-Op may also interface with one or more application functions (AF) 1215 which may be used to facilitate service delivery, for example by performing in-network processing. The v-router 1220 is also associated with a physical network node 1250, such as a router or switch.

The v-router 1220 can be VN specific. Alternatively, the v-router can be shared by multiple VNs and/or services, in which case network function interfaces 1240 with multiple VNs may be provided.

FIG. 13 illustrates a connectivity manager apparatus 1300, according to an embodiment. The apparatus includes one or more processing elements such as a computer processor 1310, a memory 1320 such as an electronic computer memory, and a network interface 1330 configured to bi-directionally communicate with other network nodes in the communication network. In this and other apparatuses, the processor and memory configuration may be supplemented or replaced with other electronic hardware, such as integrated circuits or logic gate systems. The processor and memory (or other hardware components) are configured to perform a connectivity management function 1340 which registers and tracks end point locations and provides location updates to v-routers. The connectivity management function 1340 communicates with v-routers to provide the location updates thereto, and may receive location resolution requests from the v-routers and/or other connectivity managers. The connectivity manager apparatus 1300 interacts directly or indirectly, via the network interface 1330, with end points, in order to perform the end point registration and perform location tracking of the end points, for example by obtaining location reports from edge nodes communicating with the tracked and registered end points. In some embodiments, the connectivity manager apparatus 1300 may further include a registration function 1350 to facilitate connection registrations and an admission control function 1360 to manage authentication and admission of requesting devices.

FIG. 14 illustrates an apparatus 1400 in the network which is provided using a virtualization approach. The apparatus illustrated in FIGS. 12 and 13 may be virtualized, for example. In particular, the apparatus 1400 may be configured as a v-router. The apparatus includes a physical node 1410, which may be a core network node or an edge node of the communication network. The physical node includes at least a communication interface 1415. The apparatus further includes cloud or data centre computing resources 1420 including one or more processing elements, such as computer processor(s) 1430 and memory resources 1435 that are allocated for use to the physical node 1410. The cloud/data centre resources 1420 are typically located at least partially remotely from the physical node 1410 and linked to the physical node 1410 via communication between the communication interface 1415 and a communication interface 1425 located in the cloud or data center. In other aspects, the cloud/data centre resources 1420 may be supported by one or more servers either co-located with the physical node 1410, or communicatively linked to the physical node 1410. The cloud/data centre resources 1420 may be used to implement one or more functions 1440 of the apparatus.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments may be directed to improving internal operations of the communication network.

Further, it will be readily understood that embodiments relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments utilize real and/or virtual computer resources. Such computer resources utilize, at a hardware level, a set of one or more processors operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments. For example, such an execution may correspond to a simulation of the logical operations as described herein. The software product may additionally or alternatively include number of instructions that enable a computer device to execute operations for configuring or programming a digital logic apparatus in accordance with embodiments.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope.

What is claimed is:

1. A method for routing a data packet toward a destination end point over a virtual network (VN) pre-configured on a network, the method comprising, by a virtual router associated with a VN node of the VN, the VN node being associated with a first physical network node (NN) of the network:
   receiving, from a source end point, a data packet associated with the VN and specifying a name identifier of the destination end point;
   obtaining a location corresponding to the name identifier;
   obtaining an indication of a destination VN node corresponding to the obtained location, wherein the destination VN node is associated with a second physical NN;
   obtaining an indication of an intermediate VN node on a pre-configured path between the virtual router and the destination VN node, wherein the intermediate VN node is associated with a third physical NN and wherein each of the first, the second and the third physical NN is different;
   inserting the indication of the intermediate VN node into the data packet to produce a routed data packet; and
   transmitting the routed data packet to the first physical NN to forward across the virtual network toward the intermediate VN node via a logical tunnel connecting the VN node to the intermediate VN node, the logical tunnel comprising the first physical NN and the third physical NN.

2. The method of claim 1, wherein the step of obtaining the location corresponding to the name identifier further comprises: receiving the location corresponding to the name identifier from a connectivity manager (CM) associated with the virtual router.

3. The method of claim 1, wherein the indication of an intermediate VN network node comprises a tunnel identifier.

4. The method of claim 1, wherein the inserting the indication of the intermediate VN node comprises inserting into the data packet a VN node identifier of the intermediate VN node.

5. The method of claim 1, wherein the inserting the indication of the intermediate VN node comprises inserting into the data packet a NN identifier of a next physical NN toward the intermediate VN node.

6. The method of claim 1, wherein before the routed data packet is transmitted, the method further comprises inserting into the data packet a service identifier of a service supported by the VN.

7. The method of claim 6, wherein the service identifier comprises a VN identifier corresponding to the VN.

8. The method of claim 6, wherein the service identifier comprises a VN identifier corresponding to the VN and a service identifier corresponding to the service supported by the VN.

9. The method of claim 1, wherein transmitting the routed data packet comprises submitting the routed data packed to a Software Defined Resource Allocation (SDRA) Operations (Op) entity hosted by the VN node for processing and submission to the first physical NN.

10. The method of claim 1, wherein the obtaining the location corresponds to transmitting a location resolution request including the name identifier to a connection management entity operative on the VN, and receiving a location resolution response including the location.

11. The method of claim 10, wherein the location resolution request is transmitted after checking an end point routing table to obtain the location corresponding to the name identifier and determining that at least one of the name identifier or the location is not available in the end point routing table.

12. The method of claim 1, further comprising:
receiving the data packet addressed to the destination end point and specifying a transmitting location of a sending end point; and,
updating an end point routing table with the transmitting location of the sending end point associated with a transmitting end point name identifier.

13. The method of claim 1, wherein the location is subject to a location update in response to a trigger event based upon a movement of the destination end point across at least one of a radio access network (RAN) cluster boundary and a network domain boundary.

14. A system for routing a data packet toward a destination end point over a virtual network (VN) pre-configured on a network, the system comprising a virtual router associated with a VN node of the VN, the VN node being associated with a first physical network node (NN) of the network, the virtual router comprising a network interface, a computer processor and a memory cooperatively configured to:
receive, from a source end point, a data packet associated with the VN and specifying a name identifier of the destination end point;
obtain a location corresponding to the name identifier;
obtain an indication of a destination VN node corresponding to the obtained location, wherein the destination VN node is associated with a second physical NN;
obtain an indication of an intermediate VN node on a pre-configured path between the virtual router and the destination VN node, wherein the intermediate VN node is associated with a third physical NN and wherein each of the first, the second and the third physical NN is different;
insert the indication of the intermediate VN node into the data packet to produce a routed data packet; and
transmit the routed data packet to the first physical NN to forward across the virtual network toward the intermediate VN node via a logical tunnel connecting the VN node to the intermediate VN node, the logical tunnel comprising the first physical NN and the third physical NN.

15. The system of claim 14, wherein the configuration to obtaining a location corresponding to the name identifier comprises: receiving the location corresponding to the name identifier from a connectivity manager (CM) associated with the virtual router.

16. The system of claim 14, wherein the indication of the intermediate VN node comprises a tunnel identifier.

17. The system of claim 14, wherein the configuration to insert the indication of the intermediate VN node comprises inserting into the data packet a VN node identifier of the intermediate VN node.

18. The system of claim 14, wherein the configuration to insert the indication of the intermediate VN node comprises inserting into the data packet a NN identifier of a next physical NN toward the intermediate VN node.

19. The system of claim 14, further configured, before the routed data packet is transmitted, to insert into the data packet a service identifier of a service supported by the VN.

20. The system of claim 14, wherein the configuration to transmit the routed data packet comprises submitting the routed data packed to a Software Defined Resource Allocation (SDRA) Operations (Op) entity hosted by the VN node for processing and submission to the first physical NN.

21. The system of claim 14, wherein the location is subject to a location update in response to a trigger event based upon a movement of the destination end point across at least one of a radio access network (RAN) cluster boundary and a network domain boundary.

22. The system of claim 14, wherein the configuration to:
obtain the location corresponds to transmitting a location resolution request including the name identifier to a connection management entity operative on the VN, and receiving a location resolution response including the location; and
the location resolution request is transmitted after checking an end point routing table to obtain the location corresponding to the name identifier and determining that at least one of the name identifier or the location is not available in the end point routing table.

23. The system of claim 14, wherein the network interface, computer processor and memory are further cooperatively configured to:
receive the data packet addressed to the destination end point and specifying a transmitting location of a sending end point; and,
update an end point routing table with the transmitting location of the sending end point associated with a transmitting end point name identifier.

24. A system for routing a data packet toward a destination end point over a virtual network (VN) pre-configured on a network, the system comprising a plurality of virtual routers each associated with a different VN node of the VN, the VN nodes each being associated with a different physical network node (NN) of the network; each one of the virtual routers comprising a network interface, a computer processor and a memory cooperatively configured to:
receive, from a source end point, a data packet associated with the VN and specifying a name identifier the destination end point, the virtual router associated with a VN node being associated with a first physical NN;
obtain a location corresponding to the name identifier;
obtain an indication of a destination VN node corresponding to the obtained location, wherein the destination VN node is associated with a second physical NN;
obtain an indication of an intermediate VN node on a pre-configured path between the virtual router and the destination VN node, wherein the intermediate VN node is associated with a third physical NN;
insert the indication of the intermediate VN node into the data packet to produce a routed data packet; and
transmit the routed data packet to the first physical NN to forward across the virtual network toward the intermediate VN node via a logical tunnel connecting the VN node to the intermediate VN node, the logical tunnel comprising the first physical NN and the third physical NN.

* * * * *